US009202618B2

United States Patent
Esaki et al.

(10) Patent No.: US 9,202,618 B2
(45) Date of Patent: *Dec. 1, 2015

(54) INJECTION-MOLDED REACTOR AND COMPOUND USED IN SAME

(71) Applicant: Daido Steel Co. LTD., Nagoya-shi (JP)

(72) Inventors: Junichi Esaki, Nagoya (JP); Yusuke Tozawa, Nagoya (JP); Yoshitomo Kajinami, Nagoya (JP); Kousuke Yoshimoto, Nagoya (JP)

(73) Assignee: DAIDO STEEL CO., LTD., Nagoya-Shi, Aichi (JP)

( * ) Notice: Subject to any disclaimer, the term of this patent is extended or adjusted under 35 U.S.C. 154(b) by 0 days.
This patent is subject to a terminal disclaimer.

(21) Appl. No.: 14/351,533

(22) PCT Filed: Sep. 19, 2012

(86) PCT No.: PCT/JP2012/073950
§ 371 (c)(1),
(2) Date: Jul. 14, 2014

(87) PCT Pub. No.: WO2013/042692
PCT Pub. Date: Mar. 28, 2013

(65) Prior Publication Data
US 2015/0022301 A1 Jan. 22, 2015

(30) Foreign Application Priority Data

Sep. 20, 2011 (JP) ................................. 2011-205403

(51) Int. Cl.
*H01F 27/02* (2006.01)
*H01F 27/255* (2006.01)
(Continued)

(52) U.S. Cl.
CPC .......... *H01F 27/255* (2013.01); *B29C 45/0013* (2013.01); *B29C 45/14* (2013.01);
(Continued)

(58) Field of Classification Search
CPC ........................................... H01F 27/00–27/30
USPC .................. 336/65, 83, 90, 96, 200, 232–234
See application file for complete search history.

(56) References Cited

U.S. PATENT DOCUMENTS 6,342,557 B1   1/2002  Suzuki et al.
6,469,606 B1  10/2002  Tada et al.
(Continued)

FOREIGN PATENT DOCUMENTS

| JP | 2000-91115 A | 3/2000 |
| JP | 2001-139833 A | 5/2001 |
| JP | 2003-183702 A | 7/2003 |
| JP | 2005-243769 A | 9/2005 |

(Continued)

OTHER PUBLICATIONS

International Search Report (ISR) (PCT Form PCT/ISA/210), in PCT/JP2012/073950, dated Oct. 23, 2012.
(Continued)

*Primary Examiner* — Tuyen Nguyen
(74) *Attorney, Agent, or Firm* — McGinn IP Law Group, PLLC.

(57) ABSTRACT

[Problem] Provided is an injection-molded reactor which has a further reduced loss when the reactor is in operation.
[Solution Means] The injection-molded reactor is configured by injection-molding a core using a compound for a core so that a coil obtained by winding a electric wire is embedded in the core without leaving any space therein, the compound being a compound obtained by adding a low-melting-point resin B that has a melting point of 150° C. or lower to a base resin A that is a highly heat-resistant resin with a melting point of 150° C. or higher and that accounts for most of thermoplastic resins forming a resin binder, the melting point of the low-melting-point resin B being lower than that of the base resin A, and mixing the base resin A and the low-melting-point resin B as the thermoplastic resins with a soft magnetic powder in a proportion represented by the following expression (1):

$$X \cdot (\text{soft magnetic powder}) + (100-X) \cdot ((100-Y) \cdot (\text{base resin } A) + Y \cdot (\text{low-melting-point resin } B)) \quad \text{expression (1)}$$

wherein
X is 83-96% by mass and
Y is 2-40% by mass.

4 Claims, 13 Drawing Sheets

(51) Int. Cl.

| | | |
|---|---|---|
| | *H01F 1/26* | (2006.01) |
| | *H01F 37/00* | (2006.01) |
| | *B29C 45/00* | (2006.01) |
| | *H01F 41/12* | (2006.01) |
| | *H01F 1/147* | (2006.01) |
| | *H01F 27/22* | (2006.01) |
| | *H01F 27/28* | (2006.01) |
| | *B29C 45/14* | (2006.01) |
| | *B29C 45/16* | (2006.01) |
| | *H01F 17/04* | (2006.01) |

(52) U.S. Cl.
CPC .............. *H01F1/14766* (2013.01); *H01F 1/26* (2013.01); *H01F 27/02* (2013.01); *H01F 27/22* (2013.01); *H01F 27/2823* (2013.01); *H01F 37/00* (2013.01); *H01F 41/127* (2013.01); *B29C 45/14639* (2013.01); *B29C 45/1671* (2013.01); *B29K 2995/0008* (2013.01); *H01F 2017/048* (2013.01)

(56) References Cited

U.S. PATENT DOCUMENTS

| | | |
|---|---|---|
| 6,517,744 B1 | 2/2003 | Hara et al. |
| 2003/0127157 A1 | 7/2003 | Iyoda et al. |
| 2015/0022301 A1 | 1/2015 | Esaki et al. |

FOREIGN PATENT DOCUMENTS

| | | |
|---|---|---|
| JP | 2007-027185 A | 2/2007 |
| JP | 2008-147403 A | 6/2008 |
| JP | 2008-147404 A | 6/2008 |
| JP | 2008-147405 A | 6/2008 |
| JP | 2009-176974 A | 9/2009 |
| JP | 2010-214590 A | 9/2010 |
| JP | 2010-283379 A | 12/2010 |
| JP | 2011-142193 A | 7/2011 |

OTHER PUBLICATIONS

United States Office Action dated Mar. 25, 2015 in U.S. Appl. No. 14/351,534.
International Search Report (ISR) (PCT Form PCT/ISA/210), in PCT/JP2012/073949, dated Oct. 16, 2012.

(A)

(B)

(A)

(B)

(A)

(B)

(A)

(B)

INJECTION-MOLDED REACTOR AND COMPOUND USED IN SAME

TECHNICAL FIELD

The present invention relates to an injection-molded reactor obtained by injection-molding a core so that a coil is embedded in the core without leaving any space therein, and to a compound for a core used therein.

BACKGROUND ART

Reactors which are inductance parts including a core having a built-in coil configured of a wound electric wire have conventionally been used in various fields.

For example, in hybrid vehicles, fuel cell vehicles, electric vehicles, or the like, a booster circuit has been disposed between the battery and the inverter which supplies alternating current power to a motor (electric motor), and a reactor (choke coil) which is an inductance part is used in the booster circuit.

In hybrid vehicles, for example, the battery has a voltage of about 300 V at the most, while it is necessary to apply a high voltage of about 600 V to the motor so as to obtain high output. A reactor is used as a part for the booster circuit for that purpose.

Such reactors are in extensive use in booster circuits for photovoltaic power generation and in other applications.

Conventionally known as such a reactor is an injection-molded reactor produced by injection-molding a mixture of a soft magnetic powder and a resin binder including a thermoplastic resin to thereby configure a core so that a coil obtained by winding a electric wire is embedded therein without leaving any space therein.

This kind of injection-molded reactor is disclosed, for example, in the following patent document 1.

In the injection-molded reactor, polyphenylene sulfide (PPS) resins, polyamide (PA) resins, polyetheretherketone (PEEK) resins, and the like, which have a melting point of 150° C. or higher and are excellent in terms of high heat resistance, flame retardancy, mechanical strength, and the like may be suitably used as the thermoplastic resin forming the resin binder of the core.

In this case, any of these resins including PPS resins, PA resins, and PEEK resins is usually used alone to constitute the whole thermoplastic resin.

Incidentally, in the case where an alternating magnetic field is applied to an injection-molded reactor to operate the reactor, the hysteresis loss and eddy current loss caused in the core result in a loss (core loss) whereby the applied energy is partly released in the form of heat. In injection-molded reactors in which the whole thermoplastic resin forming the resin binder of the core is constituted only of a resin excellent in terms of high heat resistance, flame retardancy, mechanical strength, etc., such as a PPS, PA, or PEEK resin, there has been a problem in that the loss is not sufficiently small.

The following patent document 2 discloses an invention which relates to "an injection-molded soft magnetic body and a soft magnetic kneaded mixture" as a prior-art technique relevant to the present invention, and polyphenylene sulfide resins, polyamide resins, polyester resins, polyethylene resins, polypropylene resins, epoxy resins, and the like are shown therein as examples of the resin used in the injection-molded soft magnetic body.

However, patent document 2 discloses neither the feature of using a combination of resins differing in melting point nor the feature of controlling the addition amount of a resin having a low melting point.

CITATION LIST

Patent Documents

Patent Document 1: JP-A-2010-214590
Patent Document 2: JP-A-2009-176974

SUMMARY OF THE INVENTION

Problem that the Invention is to Solve

The present invention has been made in consideration of the above-described circumstances, and an object thereof is to provide an injection-molded reactor which has a further reduced loss when a reactor is in operation and a compound used therein.

Means for Solving the Problem

Claim 1 relates to an injection-molded reactor, wherein a substance obtained by adding a low-melting-point resin B that has a melting point of 150° C. or lower and has a lower melting point than that of a base resin A to the base resin A that is a highly heat-resistant resin with a melting point of 150° C. or higher and that accounts for most of a thermoplastic resin is used as the thermoplastic resin forming a resin binder; a compound for a core is obtained by mixing the base resin A and the low-melting-point resin B with a soft magnetic powder in a proportion represented by the following expression (1); and the core is injection-molded by using the compound in a state where a coil in which a electric wire is wound is embedded in an inner portion without an interval to configure the injection-molded reactor, $$X \cdot (\text{soft magnetic powder}) + (100-X) \cdot ((100-Y) \cdot (\text{base resin } A) + Y \cdot (\text{low-melting-point resin } B)) \quad \text{expression (1)}$$

wherein X is 83 to 96% by mass and Y is 2 to 40% by mass.

The injection-molded reactor of claim 2 is characterized by being the reactor of claim 1 wherein the base resin A is at least one kind of polyphenylene sulfide resins, polyamide resins and polyetheretherketone resins, and the low-melting-point resin B is at least one kind of polyethylene resins, ethylene-vinyl acetate copolymer resins, polystyrene resins, and polypropylene resins.

Claim 3 relates to a compound for forming the core in the injection-molded reactor, and the compound being characterized by being the compound described in claim 1 or 2 for forming the core of an injection-molded reactor.

Advantage of the Invention

As mentioned above, the invention relates to an injection-molded reactor, wherein a substance obtained by adding a low-melting-point resin B having a melting point of 150° C. or lower in which a melting point of the low-melting-point resin B is lower than that of a base resin A to the base resin A which is a highly heat-resistant resin having a melting point of 150° C. or higher and accounts for most of a thermoplastic resin is used as the thermoplastic resin forming a resin binder; a compound for a core is obtained by mixing the base resin A and the low-melting-point resin B with a soft magnetic powder; and the core is injection-molded by using the compound in a state where a coil is embedded in an inner portion without an interval to configure the injection-molded reactor.

In the invention, in the case where the mixing ratio of the soft magnetic powder is expressed by X (% by mass; the same applies hereinafter), the mixing ratio of the thermoplastic resins is expressed by (100-X), the mixing ratio of the low-melting-point resin B in the thermoplastic resins is expressed by Y, and the mixing ratio of the base resin A in the thermoplastic resins is expressed by (100-Y), X is 83 to 96% by mass and Y is 2 to 40% by mass.

By regulating the mixing ratio X of the soft magnetic powder to 83 to 96% by mass, the inductance characteristics as the magnetic properties of the reactor and the flowability of the mixture of the soft magnetic powder and the resin binder during the injection molding of the reactor can be kept high.

In the case where the mixing ratio X of the soft magnetic powder is less than 83%, a desired value of inductance characteristics is not obtained. Conversely, in the case where the mixing ratio thereof is more than 96%, sufficient flowability is not obtained.

In the invention, as the thermoplastic resin forming a resin binder, the thermoplastic resin is prepared by adding a base resin A such as a PPS resin that accounts for most of the thermoplastic resin to a low-melting-point resin B having a lower melting point than the base resin A, as stated above.

According to this, it was confirmed that the loss characteristics of the reactor in operation was improved.

Although the reasons are unclear at present, the reasons therefor are presumed to be as follows.

One of the factors which cause loss when a reactor is in operation is thought to be as follows.

In the case of an injection-molded reactor, a mixture of a soft magnetic powder and a resin binder is injected at a high temperature of about 300° C. at which the resin binder is in a molten state, and the injected mixture is cooled in the molding die to configure a core as a molded body.

In this operation, the soft magnetic powder and the thermoplastic resin forming the resin binder are shrunk due to cooling of from the high temperature of about 300° C. finally to room temperature after demolding.

It is, however, noted that the soft magnetic powder and the thermoplastic resin considerably differ from each other in the coefficient of linear thermal expansion. Namely, the thermoplastic resin has a higher coefficient of linear thermal expansion than the soft magnetic powder and is shrunk more than the soft magnetic powder due to cooling.

As a result, a pressure (hydrostatic pressure) due to the shrinkage of the thermoplastic resin is applied to the soft magnetic powder.

For example, the coefficient of linear thermal expansion of Fe—Si-based soft magnetic powders is about $1.5 \times 10^{-5}$ (1/K), while the coefficient of linear thermal expansion of thermoplastic resins is as high as about 5-10 times the coefficient of linear thermal expansion of the powders, although depending on the kind of the resins.

Consequently, in the case where a mixture of a molten thermoplastic resin and a soft magnetic powder is regarded as being in a stress-free state, the soft magnetic powder and the thermoplastic resin are cooled from that temperature, then the thermoplastic resin is shrunk highly but the amount of shrinkage of the soft magnetic powder is small.

The difference in shrinkage amount therebetween is applied as a compressive hydrostatic pressure to the soft magnetic powder.

It is thought that this pressure (hydrostatic pressure) affects the magnetic properties of the soft magnetic powder and thereby impairing the loss characteristics of the reactor.

The phenomenon in which pressure application to a magnetic body changes the magnetic properties of the magnetic body is known as the Villari effect.

The reason for the impairment of the loss characteristics of the reactor is presumed to be as follows. The hydrostatic pressure stress which has occurred in the soft magnetic powder causes the magnetic properties (BH curve) to change, resulting in an increase in hysteresis loss, and this increased hysteresis loss impairs the loss characteristics of the reactor.

The fact that an improvement in loss characteristics was brought about in the invention by adding a low-melting-point resin B to a base resin A to configure the whole thermoplastic resins is thought to be attributable to the coefficient of linear thermal expansion of the whole thermoplastic resins which has been rendered lower, as compared with the case of using the base resin A alone to constitute the whole thermoplastic resin, by adding the low-melting-point resin B.

The decrease in the coefficient of linear thermal expansion of the whole thermoplastic resins due to the addition of a low-melting-point resin B to a base resin A having a high melting point is based on the following phenomenon.

For example, in the case of a polyphenylene sulfide (PPS) resin to be used as the base resin A, the coefficient of linear thermal expansion thereof is $8.5 \times 10^{-5}$ (1/K) in terms of average value for 20 to 150° C. The coefficient of linear thermal expansion of a low-density polyethylene (PE) resin to be used as the low-melting-point resin B is $12.0 \times 10^{-5}$ (1/K) in terms of average value for 20 to 100° C. In the case where these resins are mixed with each other, it may be thought that the coefficient of linear thermal expansion of the whole thermoplastic resins is higher than the coefficient of linear thermal expansion of the PPS resin alone. However, the fact is the reverse. An example is a mixture obtained by adding 17% by mass low-density polyethylene resin to a PPS resin (no soft magnetic powder has been mixed therewith), and the coefficient of linear thermal expansion thereof is $7.0 \times 10^{-5}$ (1/K), in terms of average value for 20 to 150° C., which is lower than the coefficient of linear thermal expansion of the PPS resin itself.

This phenomenon is thought to occur by the following mechanism. The low-density polyethylene resin, which has a low melting point, is in a molten state at temperature of 100° C. or higher, and this molten-state low-density polyethylene resin buffers the expansion/shrinkage of the PPS resin having a high melting point.

Namely, in the case of a PPS resin alone, the shrinkage of the PPS resin due to cooling directly acts as compressive pressure on the soft magnetic powder. In contrast, in the case where a low-density polyethylene resin in a molten state is present there, the shrinkage of the PPS resin is buffered by the molten-state low-density polyethylene resin and the compressive pressure to be applied to the soft magnetic powder is suppressed (reduced).

As a result, the influence of the Villari effect on the magnetic properties of the soft magnetic powder is thought to be lessened.

Incidentally, the use of 150° C. as a border for dividing melting points into high melting points and low melting points in the invention is based on the fact that the die preheating temperature in injection molding is generally about 150° C.

The low-melting-point resin B, which has a low melting point of 150° C. or lower, is still in a molten state when the reactor is removed from the die, and solidifies thereafter during cooling to room temperature. Reactors being produced as injection-molded articles undergo an adverse influence on the soft magnetic powder because of the cooling of the thermoplastic resin even during the period from demolding to cooling to room temperature, resulting in an increase in loss. However, by using a low-melting-point resin B having a melting point of 150° C. or lower, the property deterioration due to cooling during that period can be prevented.

Also during the period when the compound is cooled from the injection temperature to the die temperature, the low-melting-point resin B, of course, serves to inhibit the thermoplastic resins from shrinking.

Suitable for use as a thermoplastic resin for forming the core of an injection-molded reactor are thermoplastic resins which are excellent in terms of high heat resistance, flame retardancy, and mechanical strength, such as PPS resins, PA resins, and PEEK resins, as stated above. However, such thermoplastic resins excellent in terms of high heat resistance, mechanical strength, etc. are high also in melting point and modulus of elasticity (Young's modulus) accordingly.

In this connection, the melting points, coefficients of linear expansion, and moduli of elasticity of those resins are shown in Table 1 together with the heat-resistance temperatures thereof

TABLE 1

| Base resin A | | | | |
|---|---|---|---|---|
| | Melting point (° C.) | Heat-resistance temperature (° C.) | Coefficient of linear thermal expansion ×10⁻⁵ (1/K) | Tensile modulus (GPa) |
| PPS resin | 280 | 220 | 8.5 *1 | 4.2 |
| PEEK resin | 340 | 250 | 7.4 *2 | 3.7 |
| PA resin | 225 to 265 | 100 to 150 | 13.1 *3 | 2.9 |

*1: average value for 20 to 150° C.
*2: average value for 20 to 210° C.
*3: average value for 20 to 130° C.

Meanwhile, the low-melting-point resin B, when added to the base resin A, can lessen the influences to be exerted on the magnetic properties of the soft magnetic powder. However, this low-melting-point resin B generally has a low modulus of elasticity and low flame retardancy because of the low melting point thereof.

In Table 2 are shown the moduli of elasticity of a low-density polyethylene resin and an ethylene-vinyl acetate copolymer resin as representative examples of the low-melting-point resin B, together with the melting points and coefficients of linear expansion thereof.

Consequently, in the case where the low-melting-point resin B is added in an amount not less than a given amount, the vibration/noise characteristics and the flame retardancy become poorer than desired reference values.

TABLE 2

| Low-melting-point resin B | | | |
|---|---|---|---|
| | Melting point (° C.) | Coefficient of linear thermal expansion ×10⁻⁵ (1/K) | Tensile modulus (GPa) |
| Low-density polyethylene resin | 110 | 12.0 *4 | 0.2 |
| Ethylene-vinyl acetate copolymer resin | 95 | 15.0 *5 | 0.05 |

*4: average value for 20 to 100° C.
*5: average value for 20 to 90° C.

Here, the reason for the impairment of the vibration/noise characteristics is thought to be as follows.

Upon application of an alternating magnetic field to a reactor, a force which causes the particles of the soft magnetic powder in the core to attract each other occurs.

At this time, the particles of the soft magnetic powder will move toward each other while elastically deforming the thermoplastic resin interposed therebetween.

Due to this, the core, which is a composite of a soft magnetic powder and a thermoplastic resin, as a bulk material undergoes magnetostriction to vibrate and make a noise.

In the case where the core is one in which a low-melting-point resin B has been added, the thermoplastic resins as a whole have a reduced modulus of elasticity since the low-melting-point resin B generally has a low modulus of elasticity because of the melting point thereof, and the thermoplastic resins are apt to undergo a larger elastic deformation between the particles of the soft magnetic powder. As a result, the distance over which the particles of the soft magnetic powder move toward each other is thought to be increased, resulting in impairment (increase) in the vibration/noise of the core.

Consequently, in the case of adding a low-melting-point resin B, there is a proper range of addition amounts thereof.

The present inventors ascertained that a proper range of the mixing ratio Y of the low-melting-point resin B is 2 to 40% by mass.

In the case where the mixing ratio of the low-melting-point resin B is less than 2%, the effect of the addition thereof is not sufficiently obtained. Conversely, in the case where the low-melting-point resin B is added in a large amount exceeding 40%, the vibration/noise characteristics and the flame retardancy become poorer than desired reference values.

It is desirable that the low-melting-point resin B should be in the state of having been evenly dispersed as fine spheres of a size of about 0.2 to 2 μm in the base resin A.

In the invention, it is desirable that at least one kind of polyethylene (PE) resins, ethylene-vinyl acetate copolymer (EVA) resins, polystyrene (PS) resins and polypropylene (PP) resins should be used as the low-melting-point resin B to be added to the base resin A (resin which accounts for most of the thermoplastic resins) (claim 2).

Especially from the standpoint of unsusceptibility to pyrolysis in the temperature range of from the melting point to about 370° C., polyethylene resins and ethylene-vinyl acetate copolymer resins are suitable.

Although either low-density polyethylene resins or high-density polyethylene resins can be used as the polyethylene resins (the high-density polyethylene resins have a melting point of 120°, which is substantially equal to that of the low-density polyethylene resins), low-density polyethylene resins are desirable from the standpoint that these resins show satisfactory dispersibility when mixed with the base resin A and kneaded.

Claim 3 relates to a compound for forming the core of an injection-molded reactor. By using the compound of claim 3 to injection-mold a reactor core, an injection-molded reactor which is excellent in terms of various properties including inductance, flowability, loss, vibration/noise, and flame retardancy can be obtained.

In the invention, other configurations of the reactor may be as follows.

(With Respect to Components of the Soft Magnetic Powder)

It is desirable in the invention that a powder of pure Fe or a powder having a composition containing 0.2 to 9.0% (% by mass; the same applies hereinafter) of Si should be used as the soft magnetic powder.

Pure Fe has the drawback of being high in core loss, but is inexpensive and easy to handle and has the feature of being second in magnetic flux density only to Permendur among the magnetic materials. Consequently, it is desirable to use a powder of pure Fe in the case where that feature is important.

The powder of an Fe-based soft magnetic alloy which contains 0.2 to 9.0% of Si comes to have a lower magnetic flux density than pure Fe as the Si content increases. However, this powder is effective in reducing core loss. This powder hence has an advantage in that a satisfactory balance between the two properties is attained and that the powder is easy to handle.

Especially when the Si content is 6.5%, the core loss has a minimum value and the magnetic flux density is relatively high. This powder is hence an excellent soft magnetic material.

As the Si content exceeds beyond 6.5%, the core loss comes to increase. However, this powder in which the Si content is up to 9.0% is fully practical because the magnetic flux density thereof is high.

It is, however, noted that the powder in which the Si content is higher than 9.0% has a low magnetic flux density and causes an increase in core loss.

Meanwhile, in the case where the Si content is less than 0.2%, this powder has substantially the same features as pure Fe.

A powder of an Fe-based soft magnetic alloy which contains Si in an amount of 6 to 7% attains a satisfactory balance between inductance characteristics and heat generation properties. In the case where these properties are important, it is desirable to use the powder having a composition containing 6 to 7% of Si.

Meanwhile, a powder which contains 2 to 3% of Si attains a satisfactory balance between cost and performances including inductance characteristics and heat generation properties. In the case where this feature is important, it is desirable to use the powder containing 2 to 3% of Si.

In the invention, it is possible to add beforehand one or more of Cr, Mn, and Ni as optional elements to the soft magnetic powder according to need.

In the case of adding Cr, however, it is desirable to regulate the addition amount thereof to 5% by mass or less. This is because this regulation facilitates a further reduction in core loss.

Furthermore, it is desirable that the total content of Mn and Ni should be 1% by mass or less. This is because such total content thereof makes it easy to maintain low coercive force.

(With Respect to the Powder)

The soft magnetic powder may use powder which is formed by an atomization method through gas atomization, water atomization, centrifugal atomization, combination thereof (for example, gas and water atomization), or rapid cooling just after the gas atomization, or the like, a mechanical crush method through a jet mill, a stamp mill, a ball mill, or the like, a chemical reduction, and the like.

From the viewpoint that mechanical energy is not required in the crush in which distortion is relatively decreased, a spherical type is easily formed, dispersibility is improved, or the like, it is preferable that the soft magnetic powder be powder formed by the atomization method. From the view point that the distortion is decreased, oxidation also is decreased, and the like, it is more preferable that the soft magnetic powder be a powder formed by a gas atomization method.

For example, from the viewpoint of yield of the powder at the time of the atomization, mixing torque or firing properties at the time of mixing, flowability at the time of the injection-molding, frequency used, or the like, a particle diameter of the soft magnetic powder is preferably a range of 1 to 500 μm, is more preferably a range of 5 to 250 μm, and is most preferably a range of 10 to 150 μm.

In the powder, effects which reduce eddy current loss are increased as the particle diameter is decreased. However, conversely, hysteresis loss may be increased. Therefore, it is preferable that the upper and lower limits of the particle diameter of the powder, distribution of the particle diameter, and the like are determined according to balance between the yield of the powder (that is, costs) and the obtained effects (that is, core loss), the used frequency, or the like.

In order to remove the distortion or improve coarsening of crystal particles, it is preferable that the soft magnetic powder be subjected to a heat treatment. As conditions of the heat treatment, temperature of 700° C. to 1000° C. and times of 30 minutes to 10 hours under the atmosphere of either or both of hydrogen or argon may be exemplified.

(Process for Producing the Compound)

The compound for the core, which includes a soft magnetic powder and a resin binder constituted of thermoplastic resins including a base resin A and a low-melting-point resin B, can be produced by mixing the soft magnetic powder with the base resin A and low-melting-point resin B which are included in the thermoplastic resins, so as to result in a proper proportion, and subjecting the resultant mixture to, for example, a step in which the ingredients are kneaded together using a kneader, e.g., a twin-screw kneader, while keeping the resin binder in a molten state.

One or more of various additives such as an antioxidant, aging inhibitor, ultraviolet absorber, and colorant may be incorporated into the resin binder according to need.

(Reactor Structure)

The injection-molded reactor may be configured in the following manner A coil is encased in a state where the coil is entirely enclosed from the outside by the electrically insulating resin to configure the encased coil body, and the core is configured by the molded body which is formed by injection-molding the mixture (compound) including the soft magnetic powder and the thermoplastic resin in the state where the encased coil body is integrally embedded in the inner portion of the core. The core is configured so that the primary molded body which includes the tubular outer circumferential molded portion contacting the outer circumferential surface of the encased coil body, and the secondary molded body which includes an inner circumferential molded portion contacting the inner circumferential surface of the encased coil body are joined to each other at a boundary surface and are integrated.

The reactor having such a configuration can be produced in the following manner.

Namely, the reactor can be produced using the following method. Step A which injection-molds the core is divided into the step A-1 which injection-molds the primary molded body which includes a tubular outer circumferential molded portion of the core contacting the outer circumferential surface of the encased coil body in the shape having the opening for inserting the encased coil body in one end side in the coil axial direction in advance, and the step A-2 which molds the secondary molded body which includes the inner circumferential molded portion contacting the inner circumferential surface of the encased coil body; and in the step A-2, the secondary molded body which includes the inner circumferential molded portion is molded in the state where the encased coil body is fitted to the outer circumferential molded portion of the primary molded body obtained through the step A-1 in the state of being innerly fitted and the outer circumferential molded portion is held so as to be constrained in the radial direction from the outer circumferential side in the secondary molding die for the core, and simultaneously, the secondary molded body, the primary molded body, and the encased coil body are integrated with one another.

In the case where a reactor is configured by injection-molding a core in such a manner that a coil is merely set within the injection molding die before the core is formed by injection molding, the following difficult problem arises.

For example, the temperature of the mixture of the soft magnetic powder and the thermoplastic resin at the time of the injection into the cavity of the molding die is 300° C. or more in a liquid of a molten state, and after the injection, the mixture is cooled through the molding die in the inner portion of the molding die and solidified, and becomes a molded body.

At this time or thereafter, in the process in which the molded body is taken out from the molding die and is cooled to room temperature, the core which is the molded body tends to largely shrink in the radial direction.

However, since the coil made of a metal is positioned in the inner portion of the core, the core cannot shrink in the radial direction in the outer circumferential side of the coil (there is a great difference in a thermal expansion coefficient between the core and the coil made of a metal), as a result, the outer circumferential portion of the coil is shrunk in the circumferential direction, and a crack occurs in an outer circumferential molded portion.

The occurrence of the crack in the core becomes a factor which decreases the performance for the reactor.

However, in the case where a reactor having the configuration described above is produced by the process described above, this process is free from the problem in which during core molding, the outer circumferential molded portion cracks due to the coil located inside the core. This is because the outer circumferential portion (outer circumferential molded portion) of the core in this process has been molded alone in advance as a primary molded body separately from the coil.

Namely, since the primary molded body including the outer circumferential molded portion is molded alone in advance separately from the coil, the primary molded body or, more specifically, the outer circumferential molded portion can freely shrink with cooling during molding of the primary molded body.

Meanwhile, the secondary molded body including an inner circumferential molded portion which is in contact with the inner circumferential surface of a coil (strictly speaking, the inner circumferential surface of an encased coil body) is molded integrally with the coil, while keeping the coil set in the molding die. Since this inner circumferential molded portion does not particularly suffer any resistance by the coil when shrinking radially, this shrinkage does not especially pose the problem of cracking.

Namely, according to the production process described above, the problem in which the core cracks due to the presence of the coil can be effectively overcome.

In this production process, the secondary molded body which includes the inner circumferential molded portion can be molded in a state where the encased coil body is fitted to the outer circumferential molded portion of the primary molded body obtained through the step A-1 in the state of being innerly fitted and the outer circumferential molded portion is held so as to be constrained in the radial direction from the outer circumferential side in the secondary molding die for the core.

In the case where the secondary molded body of the core is molded in the state, the positional misalignment of the coil from the set position due to the injection pressure and the flow pressure can be prevented when the secondary molded body is molded, and the molding of the core can be completed in the state where the coil is precisely positioned at the previously-set position and held.

Accordingly, it is possible to favorably prevent the characteristics of the coil composite molded body from being subjected to adverse effects due to the positional misalignment of the coil at the time of molding the core.

The encased coil body can be configured by forming the resin covering layer from a thermoplastic resin which contains no soft magnetic powder, by joining a molded body including an outer-circumference covering portion that covers the outer circumferential surface of the coil to a molded body including an inner-circumference covering portion that covers the inner circumferential surface of the coil, thereby integrating the molded bodies with each other.

In the case where an encased coil body is thus configured, a reactor including this encased coil body can be produced in the following manner.

Namely, the resin covering layer of an encased coil body is formed by injection molding so that step B for the injection molding is divided into: step B-1 in which a primary molding die for resin covering layer formation is brought into contact with the inner circumferential surface or outer circumferential surface of a coil and a resin material is injected into the primary molding cavity of the primary molding die formed on the outer circumferential side or inner circumferential side of the coil in a state where the coil is constrained by the primary molding die so as to be positioned in a radial direction in the inner circumferential surface or the outer circumferential surface, thereby molding a primary molded body which includes the outer-circumference covering portion or inner-circumference covering portion in the resin covering layer and also integrating the primary molded body and the coil; and step B-2 in which the primary molded body is thereafter set, together with the coil, in a secondary molding die for resin covering layer formation and a resin material is injected into the secondary molding cavity of the secondary molding die formed on the inner circumferential side or outer circumferential side of the coil to mold a secondary molded body which includes the inner-circumference covering portion or outer-circumference covering portion of the resin covering layer and to integrate the secondary molded body, the coil, and the primary molded body. Reactor production can be thus conducted.

According to this production process, when the encased coil body is injection-molded, since the molding can be performed so as to be divided into two times, the encased coil body, that is, the resin covering layer can be favorably injection-molded in the state where the coil is held so as to be favorably positioned by the molding die, and it is thus possible to favorably prevent the positional misalignment of the coil due to the injection pressure or the flow pressure at the time of the molding, and the resin covering layer can be favorably molded in a coil-encasing state.

The reactor of the invention may be suitably used as reactors for use in an alternating magnetic field having a frequency of 1 to 50 kHz, such as, for example, reactors for use in the booster circuits of hybrid vehicles, fuel cell vehicles, electric vehicles, or photovoltaic power generation.

MODES FOR CARRYING OUT THE INVENTION

Next, embodiments of the invention will be described below in detail by reference to drawings.

Figure 1:
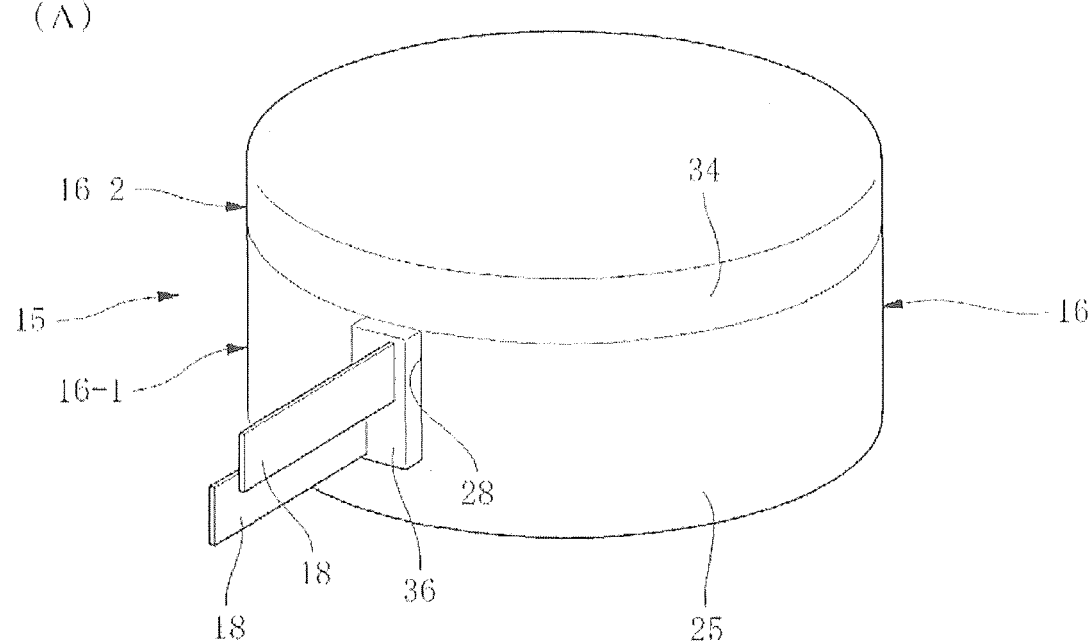
FIG. 1 describes views showing a reactor of an embodiment of the present invention.
Figure 1:
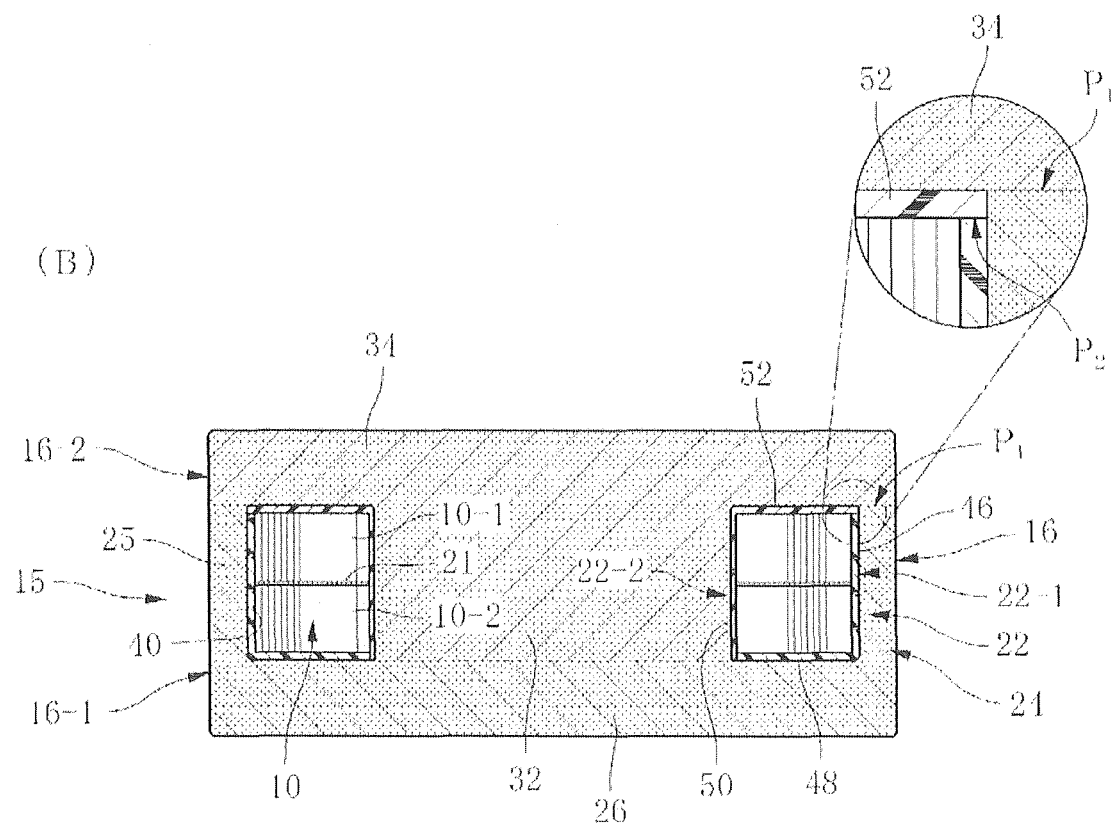

In FIG. 1, a reference numeral 15 is the reactor (choke coil) which is an inductance part, and a coil 10 with attached insulating coating is integrated so as to be an embedded state in the inner portion of a core 16 without leaving any space therebetween. That is, the core 16 is manufactured so as to be the reactor having structure with no gap.

In this embodiment, as shown in FIGS. 4 to 6(A), the coil 10 is a flat-wise coil and is formed in a coil shape by winding and superposing a rectangular wire in the thickness direction (radial direction) of the wire, in which wires adjacent in the radial direction in a state of a free shape which are processed to be wound and are molded to be superposed so as to be a state of being in contact with one another via the insulating coating.

Figure 4:
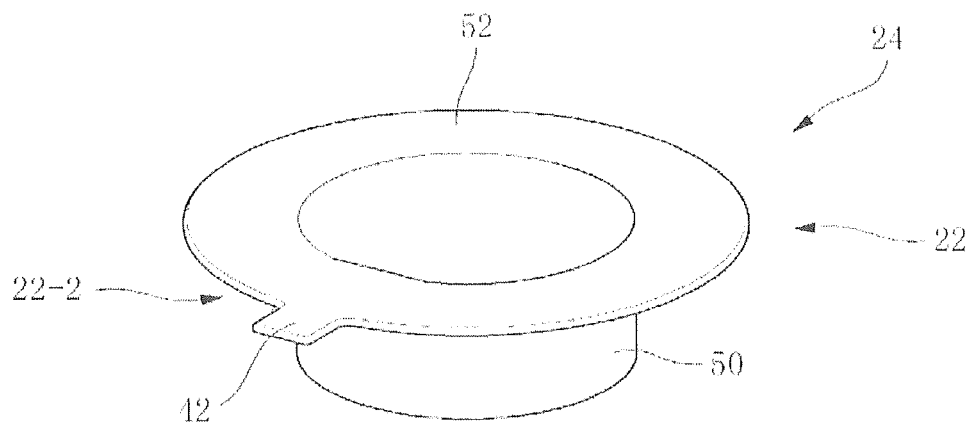
FIG. 4 is a perspective view in which the encased coil body of FIG. 3 is exploded into a resin covering layer and a coil, and illustrated.
Figure 4:
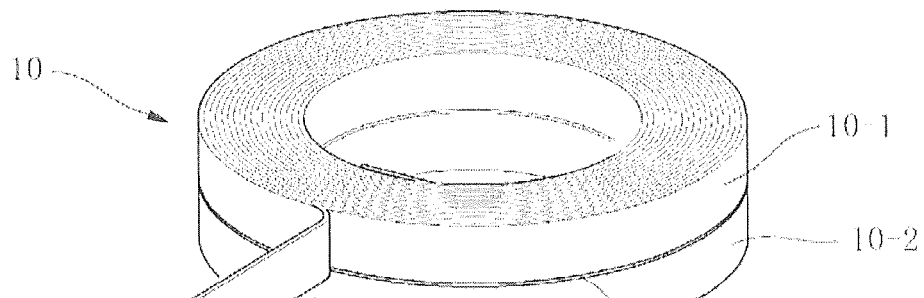
Figure 4:
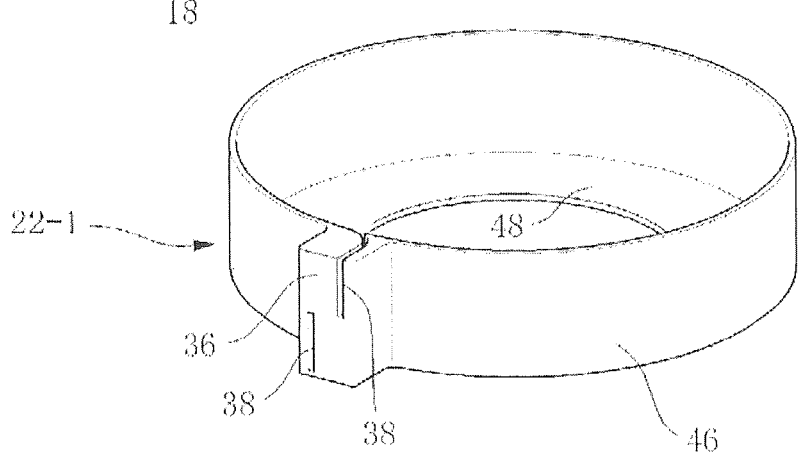
Figure 5:
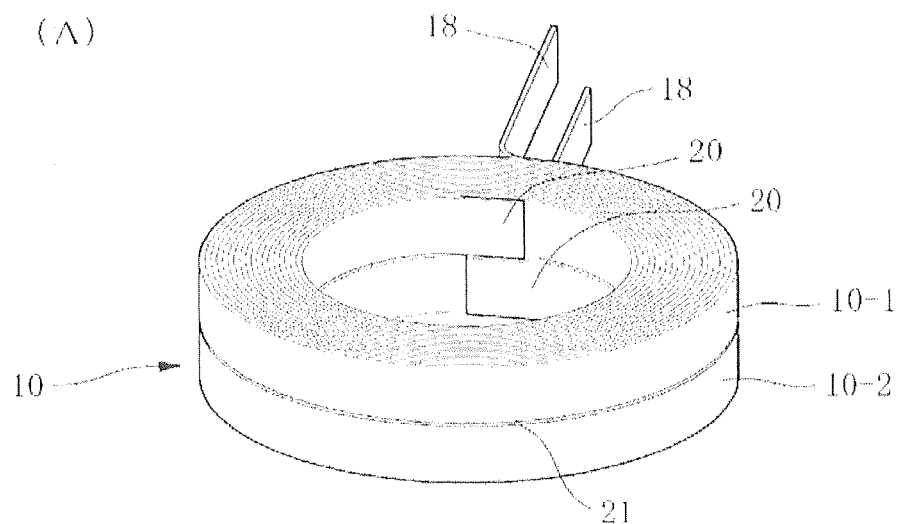
FIG. 5 describes a view when the coil of FIG. 4 is viewed from an angle other than that of FIG. 4 and a view in which the coil is exploded into an upper and lower coils and illustrated.
Figure 5:
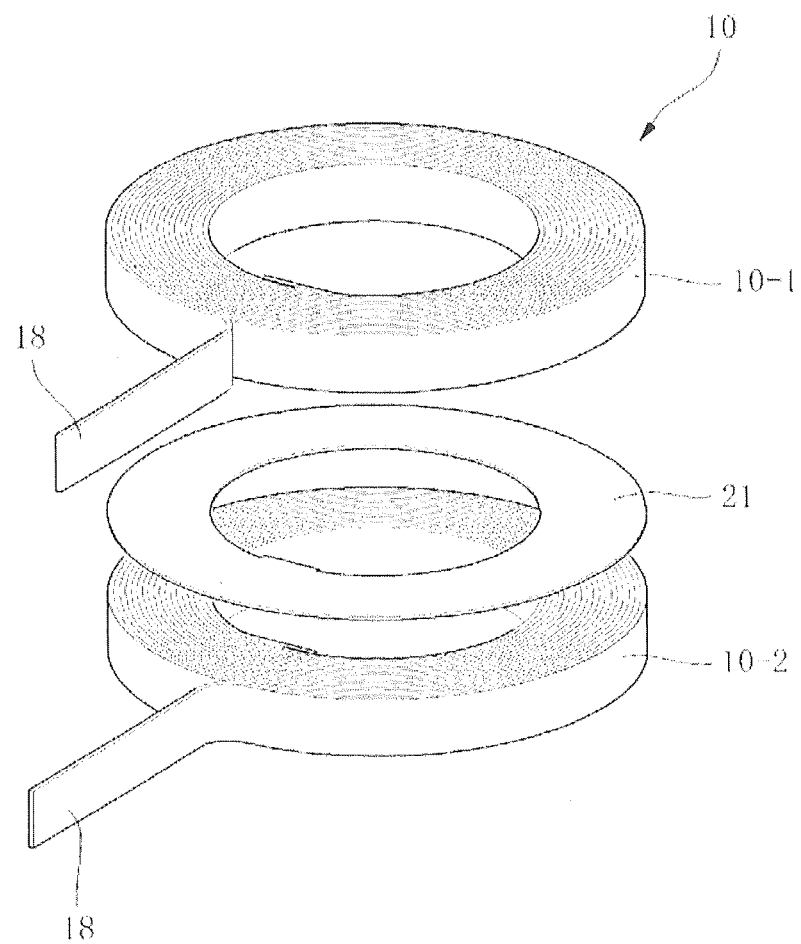

In the present embodiment, as shown in FIGS. 4 and 5, an upper coil block (hereinafter, simply referred to an upper coil) 10-1 and a lower coil block (hereinafter, simply referred to as a lower coil) 10-2 are superposed to each other in up and down directions so that the winding directions are opposite to each other, and ends 20 in each of the inner diameter sides are joined to each other, whereby the coil 10 is configured of a single continuous coil. However, the upper coil 10-1 and the lower coil 10-2 may be configured so as to be continuous by means of a single wire.

In addition, since a large electrical potential difference is generated between the upper coil 10-1 and the lower coil 10-2, as shown in FIG. 5(B), an annular insulating sheet 21 is interposed therebetween. Herein, the thickness of the insulating sheet 21 is approximately 0.5 mm.

Moreover, a reference number 18 in the drawings indicates coil terminals in the coil 10, and the coil terminals are formed so as to protrude outside in the radial direction.

As shown in FIG. 5(A), the upper coil 10-1 and the lower coil 10-2 have the same shape as each other, the planar shapes of both are an annular shape, and therefore, the entire coil 10 also has an annular shape.

Figure 2:
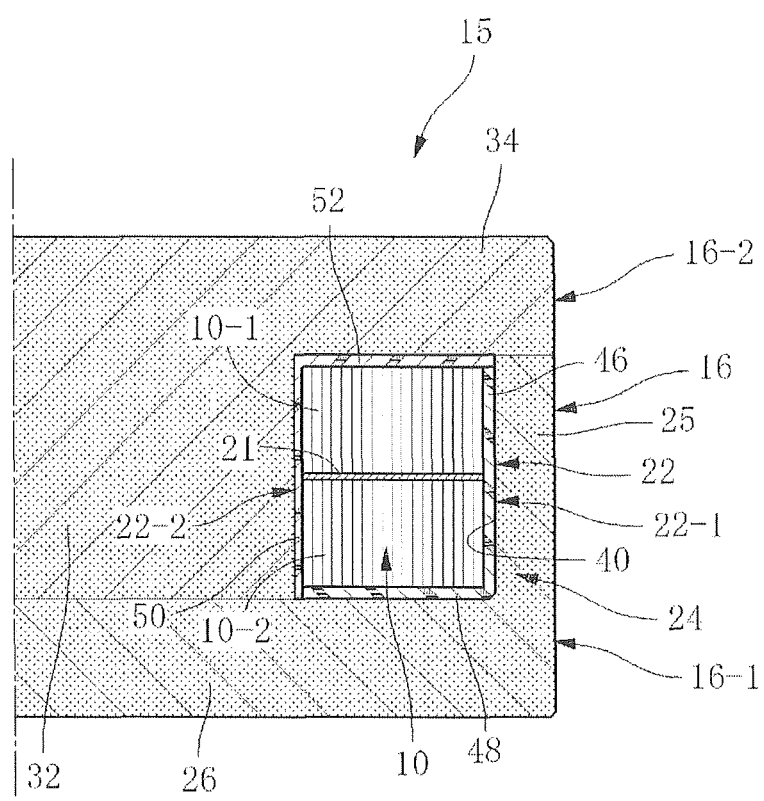
FIG. 2 is a main body cross-sectional view of the reactor in FIG. 1.

As shown in FIG. 2, the upper coil 10-1 and the lower coil 10-2 have the same vertical dimension along the coil axial direction.

Moreover, as shown in FIG. 1, the coil 10 is integrally included in the core 16 in a state of being entirely embedded in the core 16 except for a portion of the tip side of the coil terminal 18.

In this embodiment, various materials such as copper, aluminum, copper alloy, and aluminum alloy may be used for the coil 10 (Incidentally, the coil 10 is made of copper in this embodiment).

In this embodiment, the core 16 is configured of a molded body obtained by injection-molding a mixture (compound) obtained by mixing a soft magnetic powder with a resin binder constituted of thermoplastic resins including a base resin A and a low-melting-point resin B having a lower melting point than the base resin A.

The coil 10 with attached insulating coating is entirely encased by an electrically insulating resin from the outside except for a portion of the tip side of the coil terminal 18.

Figure 3:
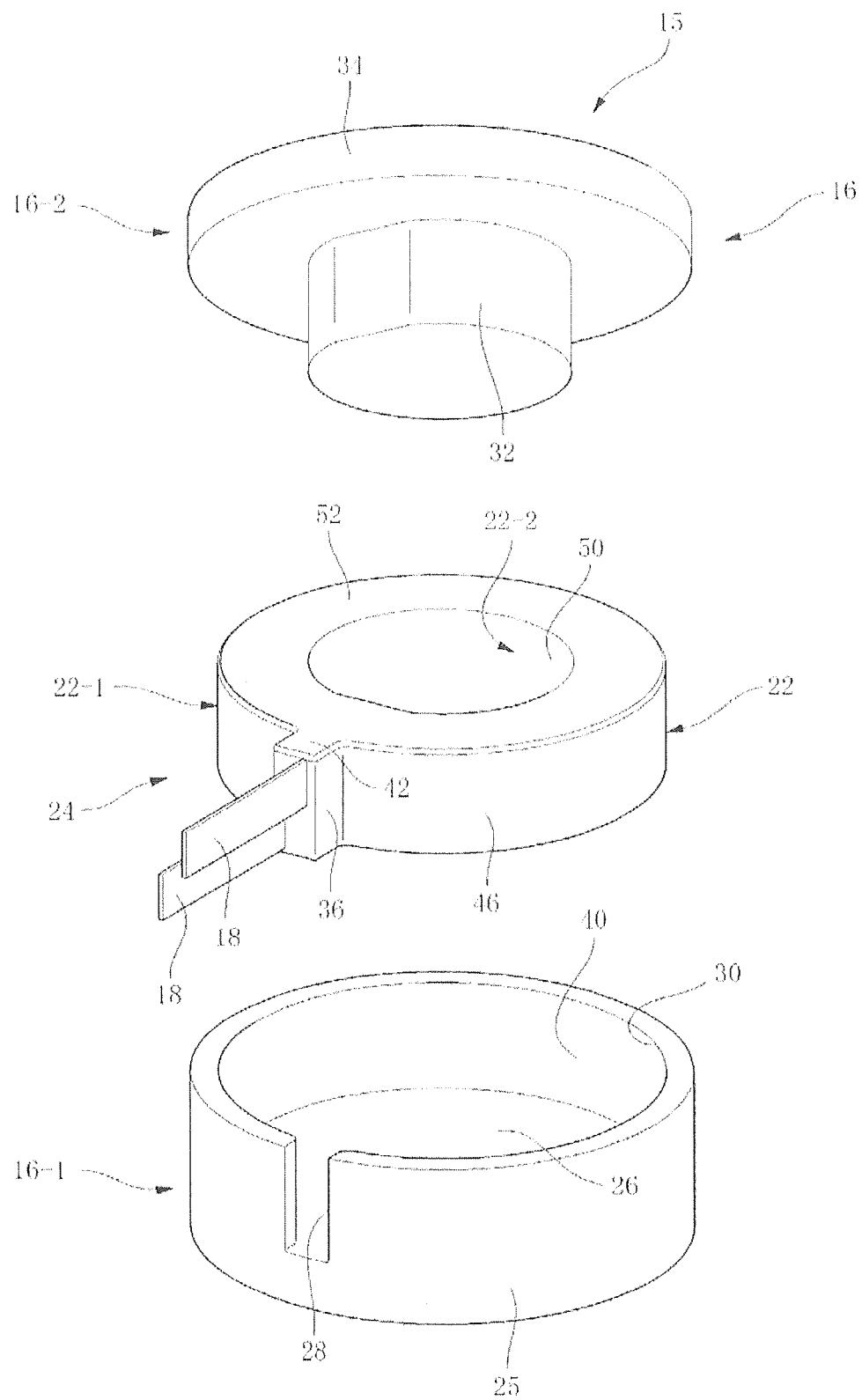
FIG. 3 is a perspective view in which the reactor of FIG. 1 is exploded and illustrated.

In FIGS. 1 and 3, a reference numeral 24 indicates the encased coil body which is configured of the coil 10 and the resin covering layer 22, in which the coil 10 is embedded in the inner portion of the core 16 as the encased coil body 24.

In this embodiment, it is preferable that the thickness of the resin covering layer 22 be 0.5 to 2.0 mm. The reasons therefor are as follows. In the case where the thickness thereof is smaller than 0.5 mm, the insulating coating has too low strength. In the case where the thickness thereof is larger than 2.0 mm, the magnetic circuit has too large a length, resulting in the necessity of enlarging the core accordingly.

The resin covering layer 22 is configured of an electrically insulating thermoplastic resin which does not contain a soft magnetic powder. As the thermoplastic resin, in addition to PPS, PA12, PA6, PA6T, POM, PE, PES, PVC, and EVA, other various materials may be used.

Also as shown in an exploded view of FIG. 3, a primary molded body 16-1 and a secondary molded body 16-2 are joined to each other using an injection-molding at a boundary surface $P_1$ shown in FIG. 1(B), so that the molded bodies are integrated to constitute the core 16.

As shown in FIGS. 1 to 3, the primary molded body 16-1 has a container-like shape that includes a cylindrical outer circumferential molded portion 25 which contacts the outer circumferential surface of the encased coil body 24 and a bottom portion 26 positioned at the lower side of the encased coil 24 in the drawings, in which an opening 30 is present at the upper end in a coil axis line direction in the drawings.

Moreover, a cutout portion 28 is provided on the outer circumferential molded portion 25 of the primary molded body 16-1.

The cutout portion 28 is one for inserting a thick portion 36 (refer to FIG. 3) of the encased coil body 24 described below.

On the other hand, also as shown in FIGS. 1 to 3, the secondary molded body 16-2 integrally includes an inner circumferential molded portion 32 which contacts the inner circumferential surface of the encased coil body 24, fills a blank space of the inner side of the coil 10, and reaches the bottom portion 26 in the primary molded body 16-1, and an upper circular cover portion 34 which is positioned upward from the encased coil body 24 in the drawings, closes the opening 30 of the primary molded body 16-1, and conceals a recess 40 of the primary molded body 16-1 and the encased coil body 24 accommodated in the recess in the inner portion.

On the other hand, as shown in an exploded view of FIG. 4, the resin covering layer 22 which encases the coil 10 is configured of a primary molded body 22-1 and a secondary molded body 22-2, and they are integrated with each other by joining through an injection-molding at a boundary surface $P_2$ shown in FIG. 1(B).

The primary molded body 22-1 integrally includes a cylindrical outer circumferential covering portion 46 which covers the outer circumferential surface of the coil 10 and a lower covering portion 48 which covers the entire lower end surface of the coil 10.

On the other hand, the secondary molded body 22-2 integrally includes a cylindrical inner circumferential covering portion 50 which covers the inner circumferential surface of the coil 10 and an upper covering portion 52 which covers the entire upper end surface of the coil 10.

Moreover, the thick portion 36 which protrudes outward in the radial direction is formed over the entire height in the primary molded body 22-1, and a pair of slits 38 which penetrates the thick portion in the radial direction is formed in the thick portion 36.

The pair of coil terminals 18 in the coil 10 penetrates the silts 38 and protrudes outward in the radial direction of the primary molded body 22-1.

In addition, a tongue-shaped protrusion 42 which protrudes outward in the radial direction is integrally formed with the upper covering portion 52 in the secondary molded body 22-2. The upper surface of the thick portion 36 in the primary molded body 22-1 is covered by the protrusion 42.

In FIGS. 3 to 10, a method of manufacture for the reactor 15 of FIG. 1 is specifically shown.

Figure 6:
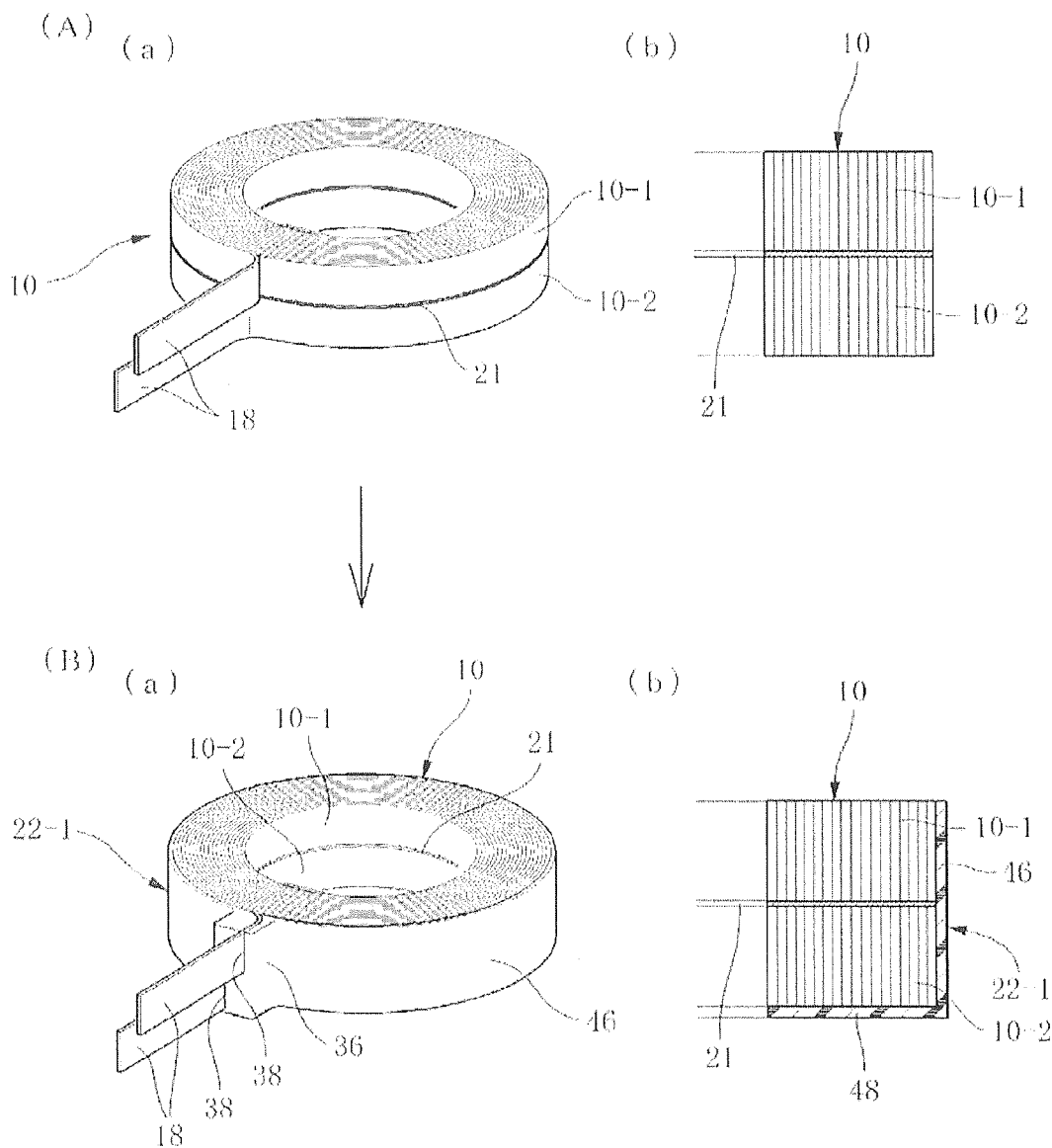
FIG. 6 describes explanatory views of a molding procedure of the encased coil body of the embodiment.
Figure 7:
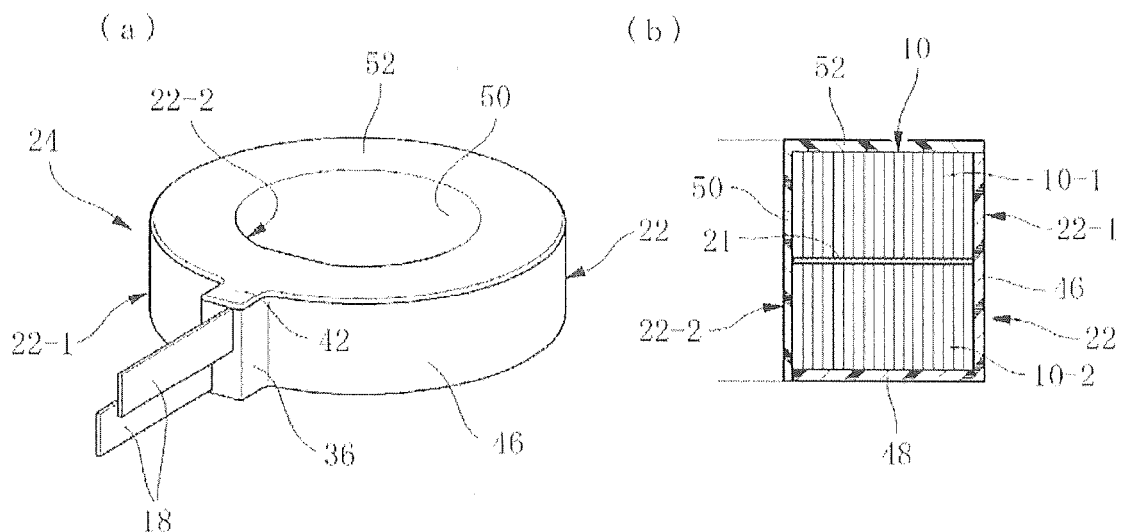
FIG. 7 describes an explanatory view of the molding procedure following FIG. 6.
Figure 7:
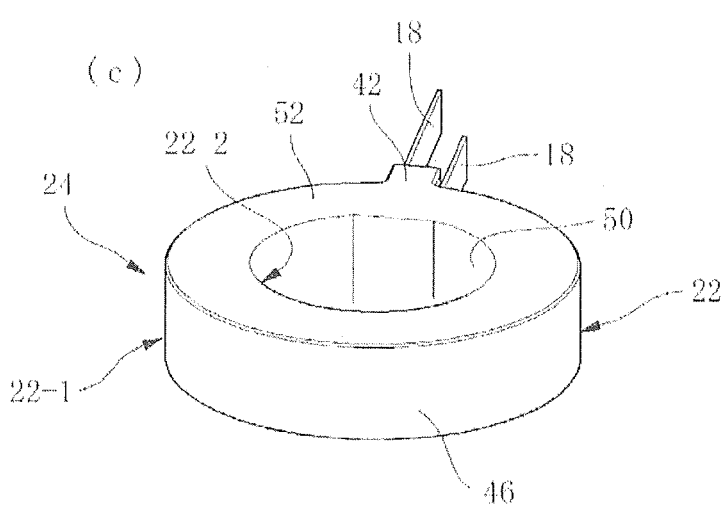

In this embodiment, according to a procedure shown in FIGS. 6 and 7, the resin covering layer 22 is formed so as to enclose the coil 10 with attached insulating coating shown in FIG. 6(A) from the outside, and the encased coil body 24 is configured by integrating the coil 10 and the resin covering layer 22.

Herein, as shown in FIG. 6(B), the primary molded body 22-1 which integrally includes the outer circumferential covering portion 46 and the lower covering portion 48 is firstly molded, and thereafter, as shown in FIG. 7(C), the secondary molded body 22-2 which integrally includes the inner circumferential covering portion 50 and the upper covering portion 52 is molded, whereby the entire resin covering layer 22 is molded.

Figure 9:
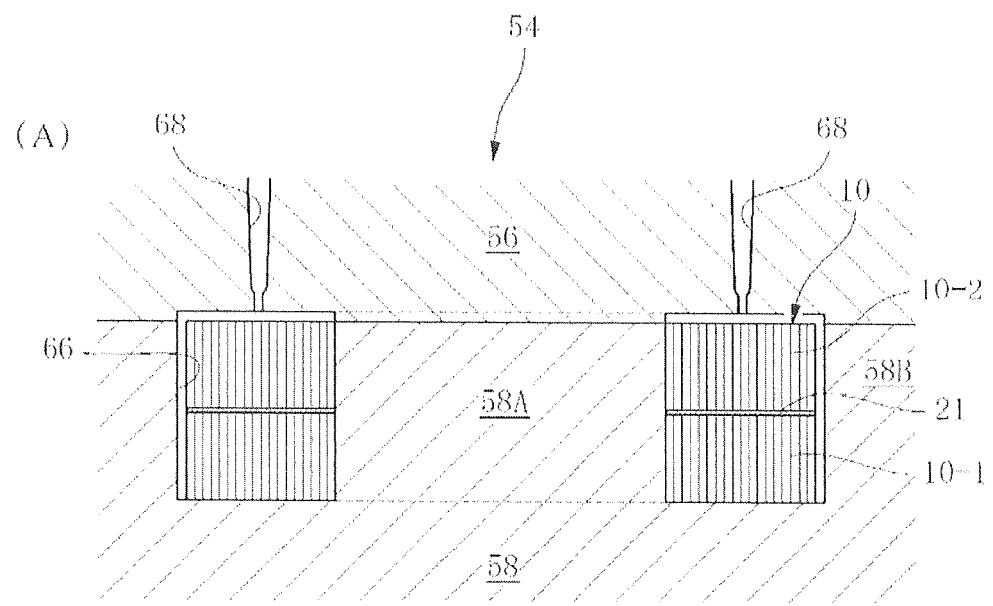
FIG. 9 shows explanatory views of a method of molding the encased coil body in the embodiment.
Figure 9:
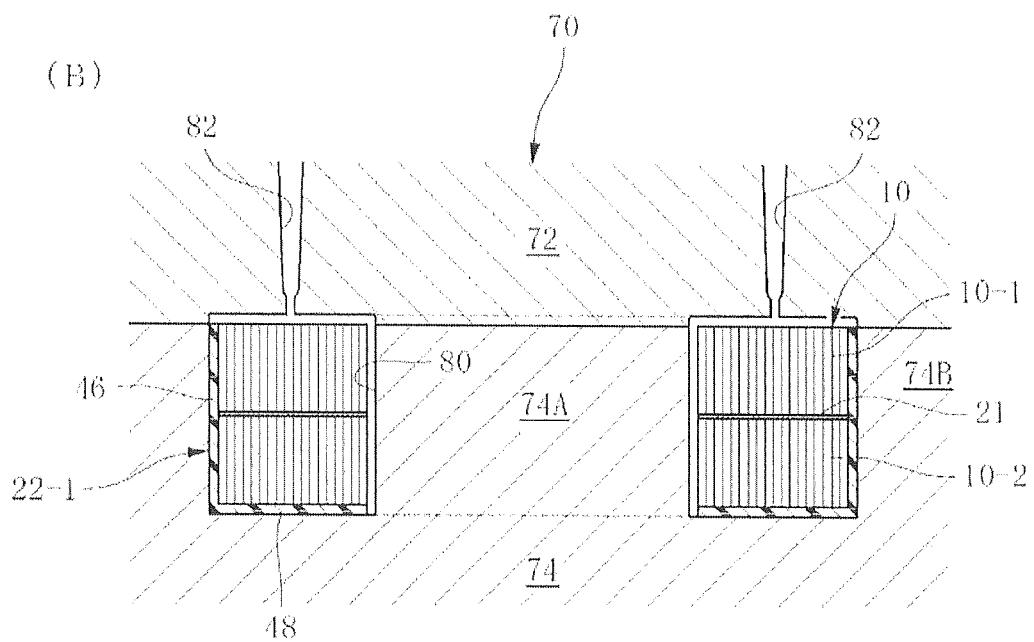

FIG. 9 shows a specific molding method at the time molding the entire resin covering layer.

In FIG. 9(A), a reference numeral 54 indicates a primary molding die for the encased coil body 24, specifically, for the resin covering layer 22, and the primary molding die includes an upper die 56 and a lower die 58.

Here, the lower die 58 includes a middle die portion 58A and an outer die portion 58B.

In a primary molding which uses the primary molding die 54 shown in FIG. 9(A), the coil 10 is firstly set to the primary molding die 54. At this time, the coil 10 is set so that the direction shown in FIG. 4 is turned upside down.

Specifically, the lower coil 10-2 is positioned at the upper side and the upper coil 10-1 is positioned at the lower side, so that the coil is set to the primary molding die 54 so as to be turned upside down.

Moreover, the middle die portion 58A is brought into contact with the inner circumferential surface of the coil 10, whereby the inner circumferential surface of the coil 10 is held so as to be restrained in the radial direction by the middle die portion 58A.

Then, a resin (thermoplastic resin) material is injected into a cavity 66, which is formed on the outer circumferential side of the coil 10 of the primary molding die 54, through a passage 68, and the primary molded body 22-1 of the resin covering layer 22 shown in FIGS. 1 and 6(B) is injection-molded.

Specifically, the primary molded body 22-1, which integrally includes the outer circumferential covering portion 46 and the lower covering portion 48 shown in FIG. 9(B), is injection-molded.

After the primary molded body 22-1 of the resin covering layer 22 is molded in this way, the primary molded body 22-1 is set to a secondary molding die 70 shown in FIG. 9(B) along with the coil 10 which is integrated with the primary molded body 22-1.

At this time, as shown in FIG. 9(B), the coil 10 is set to the secondary molding die 70 so as to be turned upside down along with the primary molded body 22-1.

The secondary molding die 70 includes an upper die 72 and a lower die 74. In addition, the lower die 74 includes a middle die portion 74A and an outer die portion 74B.

In a state where the secondary molding die 70 sets the primary molded body 22-1 along with the coil 10, a cavity 80 is formed on the inner circumferential side and the upper side of the coil.

In the secondary molding using the secondary molding die 70, the same resin material as the resin material at the time of the primary molding is injected into the cavity 80 through a passage 82, and the secondary molded body 22-2 in the resin covering layer 22 is injection-molded, and simultaneously, the secondary molded body is integrated with the primary molded body 22-1 and the coil 10.

In the present embodiment, the encased coil body 24 which is molded as mentioned above is integrated with the core 16 at the time of molding of the core 16 of FIG. 1.

Figure 8:
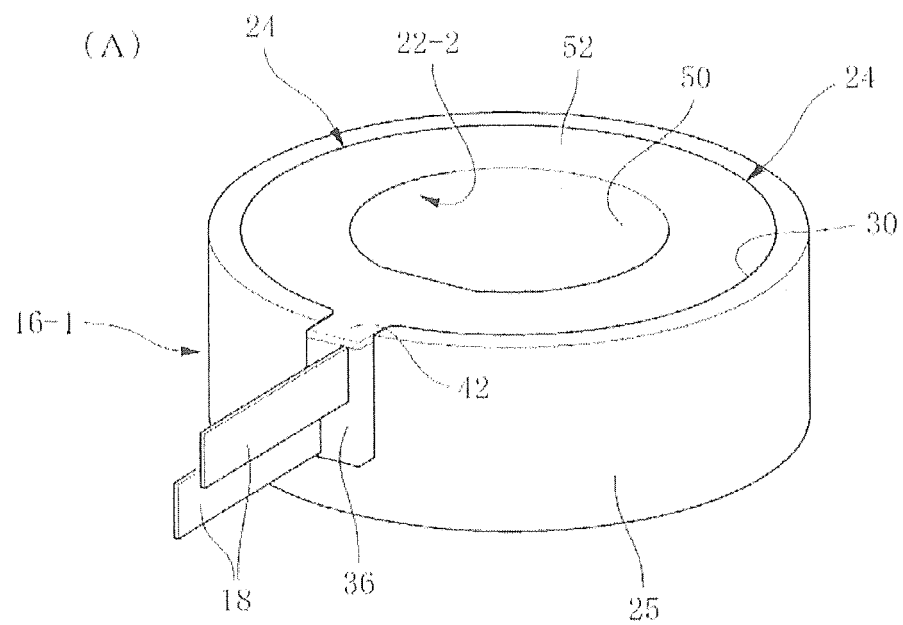
FIG. 8 describes process explanatory views of a method of manufacture for the reactor of the embodiment.
Figure 8:
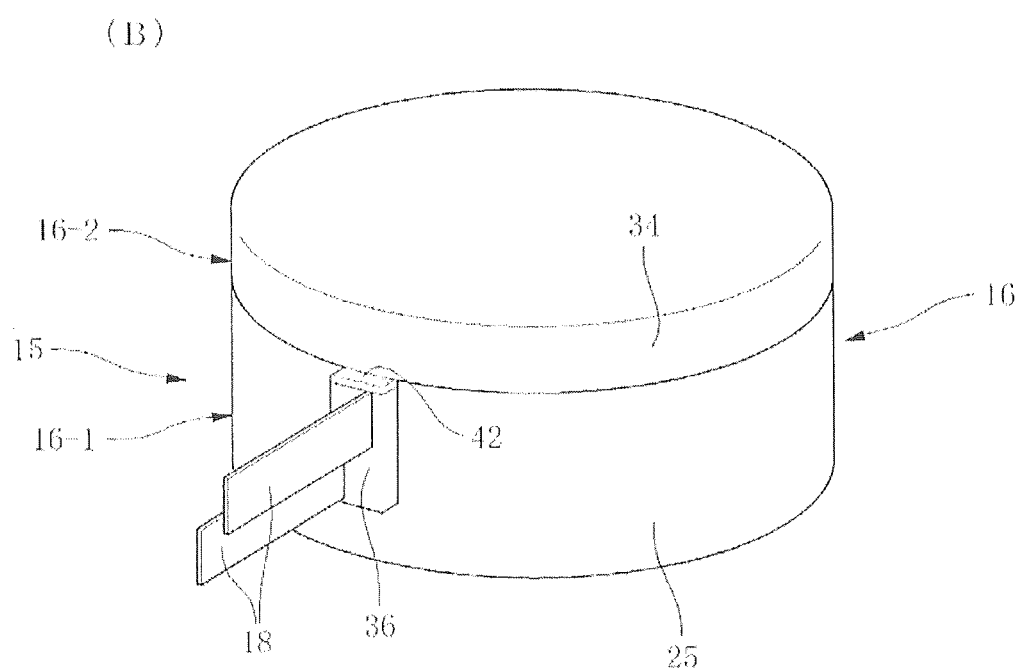
Figure 10:
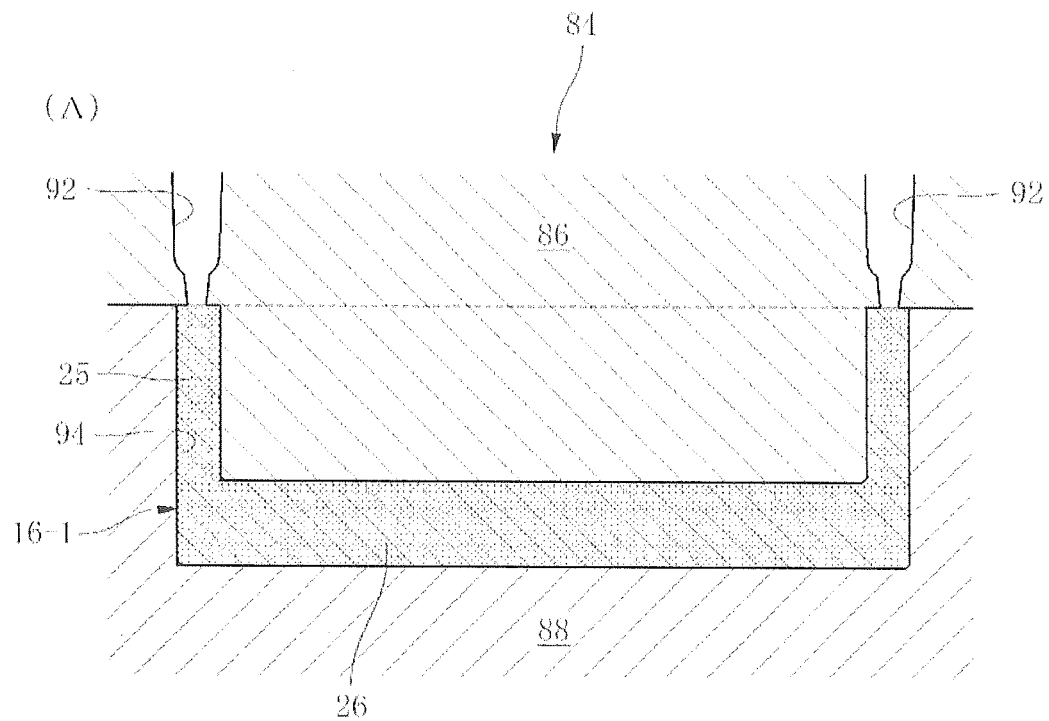
FIG. 10 shows explanatory views of a method of molding the core in the embodiment.
Figure 10:
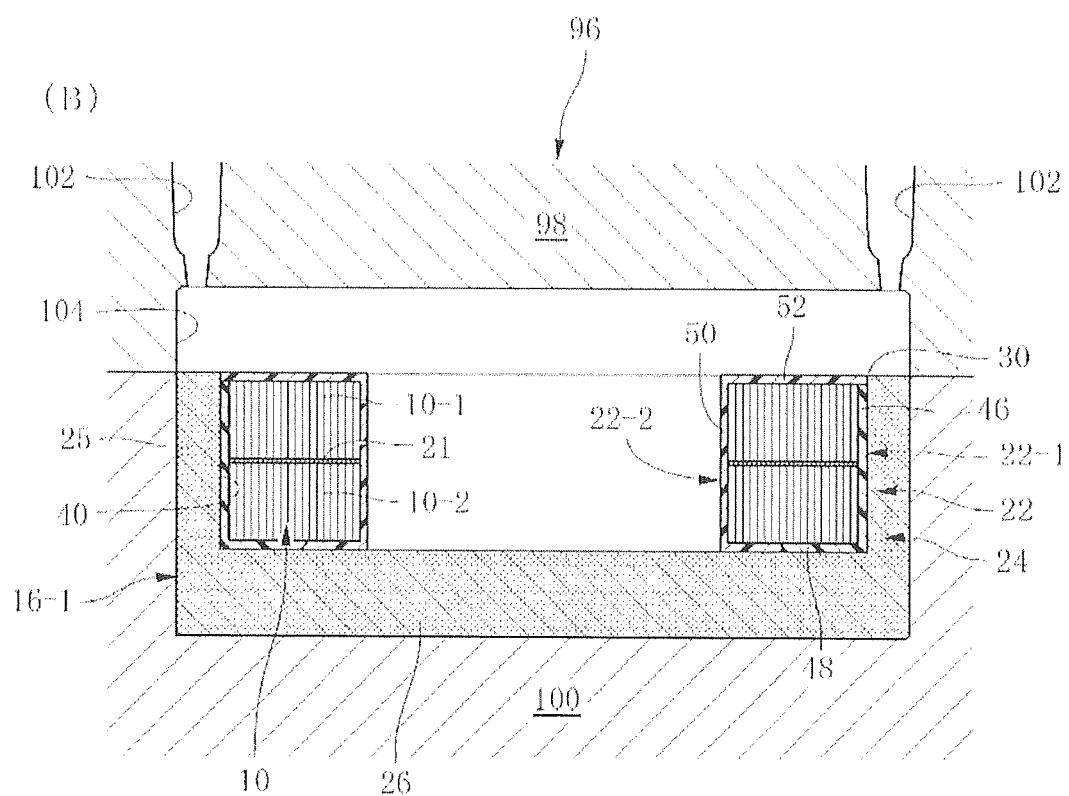

The specific procedures are illustrated in FIGS. 8 and 10.

In this embodiment, when the entire core 16 is molded, as shown in FIG. 8, the primary molded body 16-1 having a container shape is firstly molded in advance.

Thereafter, as shown in FIG. 8(A), the encased coil body 24 molded according to the procedure shown in FIGS. 6 and 7 is inserted into the inner portion of the recess 40 of the primary molded body 16-1 having a container shape over the entire height downward in the drawings through the opening 30 of the primary molded body 16-1, so that the encased coil body 24 is held by the primary molded body 16-1.

Moreover, in that state, the primary molded body 16-1 and the encased coil body 24 are set to the molding die, and the secondary molded body 16-2 in the core 16 is injection-molded so as to be integrated with the primary molded body 16-1 and the encased coil body 24.

FIG. 10(A) shows the primary molding die for the core 16 which molds the primary molded body 16-1.

A reference numeral 84 indicates the primary molding die which molds the primary molded body 16-1 and includes an upper die 86 and a lower die 88.

Here, the mixture (compound) of the soft magnetic powder and the resin binder is injection-molded to a cavity 94 through a passage 92, whereby the primary molded body 16-1 which integrally includes the outer circumferential molded portion 25 and the bottom portion 26 is molded.

FIG. 10(B) shows the secondary molding die which molds the secondary molded body 16-2 in the core 16.

A reference numeral 96 indicates the secondary molding die and includes an upper die 98 and a lower die 100.

In the secondary molding, the encased coil body 24 is firstly inserted into the molded primary molded body 16-1, and in a state of being held, these are set to the secondary molding die 96.

At this time, the outer circumferential surface of the primary molded body 16-1 contacts the entire circumference of the secondary molding die 96, and therefore, the primary molded body 16-1 is positioned in the radial direction. In addition, the lower surface of the bottom portion 26 is held in the state of being positioned in up and down directions in the secondary molding die 96.

That is, the encased coil body 24 is held so as to be positioned not only in the radial direction but also in the up and down directions in the secondary molding die 96 via the primary molded body 16-1.

In the secondary molding, in that state, the same mixture as that used at the time of the primary molding is injected into a cavity 104 through a passage 102 disposed further upward than the cavity 104 in the drawings, whereby the secondary molded body 16-2 of FIGS. 1(B), 3 and, 8(B) is molded, and simultaneously, the secondary molded body 16-2 is integrated with the primary molded body 16-1 and the encased coil body 24.

Here, the reactor 15 shown in FIGS. 1 and 8(B) is obtained.

In the embodiment described above, the mixture of a soft magnetic powder and thermoplastic resins is injected, while the coil 10 covered with an insulating coating is kept in the state of being encased in and protected by the resin covering layer 22, thereby molding the core 16. Consequently, during the injection, the soft magnetic powder such as an iron powder, contained in the mixture is not struck hard or rubbed against the insulating coating of the coil 10. It is therefore possible to effectively prevent the trouble that during the molding of the core 16, the soft magnetic powder strikes on the insulating coating of the coil 10 to thereby damage the insulating coating.

Moreover, since the resin covering layer 22 is present as a protective layer or a buffer layer between the core 16 and the insulating coating of the coil 10, heat stress due to the expansion and shrinkage of the core 16 does not directly act on the insulating coating and, hence, the problem of the damage of the insulating coating due to the heat stress can be solved.

In addition, since the coil 10 has been integrated with the resin covering layer 22 to configure the encased coil body 24, the coil 10 can be satisfactorily prevented from deforming when the core 16 is injection-molded.

Furthermore, in this embodiment, since the outer circumferential molded portion 25 in the core 16 is molded alone as a primary molded body 16-1 in advance separately from the coil 10, the production process is free from the problem in which during the molding of the core 16, the outer circumferential molded portion 25 cracks due to the coil 10 located inside the core 16.

Moreover, the secondary molded body 16-2 of the core is molded in the state where the encased coil body 24, that is, the coil 10 is held so as to be positioned in the secondary molding die 96 for the core 16 via the primary molded body 16-1. Accordingly, at this time, the positional misalignment of the coil 10 from the set position due to the injection pressure and the flow pressure can be prevented, and the molding of the core 16 can be completed in the state where the coil 10 is precisely positioned at the previously-set position and held.

Accordingly, it is possible to favorably prevent the characteristics of the reactor 15 from being subjected to adverse effects due to the positional misalignment of the coil 10 at the time of molding the core 16.

Furthermore, in the present embodiment, when the resin covering layer 22 of the encased coil body 24 is injection-molded, since the molding is performed so as to be divided into at least twice, the molding can be performed in the state where the coil 10 is held so as to be favorably positioned by the molding die, and it is thus possible to favorably prevent the positional misalignment or the deformation of the coil 10 due to the injection pressure or the flow pressure at the time of the molding.

EXAMPLES

The mixing ratio X of a soft magnetic powder in the core 16 of a reactor 15 and the mixing ratio of a low-melting-point resin B as a thermoplastic resin to a base resin A were variously changed to examine the influences thereof on properties including loss, vibration, noise, flammability, flowability, and inductance.

(a) Configuration of Reactor

In the Examples and Comparative Examples shown in Tables 3 and 4, a soft magnetic powder having the composition Fe-6.5Si (% by mass) was used for the core 16 and a PPS resin and a low-density polyethylene resin were used respectively as a base resin A and a low-melting-point resin B in the thermoplastic resins.

The PPS resin and low-density polyethylene resin used are as follows.

PPS resin: DIC Corp.; product name, H-1G; linear PPS resin; 200-μm pulverized powder Low-density polyethylene resin: Ube-Maruzen Polyethylene Co., Ltd.; product name, UM8350; 200 μM pulverized powder The soft magnetic powder used was a gas-atomized powder obtained by atomization with argon gas. The powder was heat-treated in hydrogen at 750° C. for 3 hours for the purposes of oxidation prevention and reduction.

On the supposition of use of the core in an alternating magnetic field of 1 to 50 kHz, the soft magnetic powder after the heat treatment was sieved to recover 250 μm and smaller particles before use.

This soft magnetic powder was mixed with a resin binder in each of the mixing ratio shown in Tables 3 and 4 and kneaded with a twin-screw kneader together with the resin binder, etc. melted at about 300° C., and the mixture was pelletized to prepare a compound.

Using a horizontal in-line screw type injection molding machine, the compound was heated at about 300° C. and brought into a molten state and was then injected into a die preheated at 150° C. The die was cooled to mold a core 16.

A coil 10 was produced in the following manner. A rectangular pure-copper wire (wire dimensions: thickness, 0.85 mm; width, 9 mm) coated with an insulating coating made of a polyamide-imide resin (thickness of the coating, 20 to 30 μm) was flat-wise wound to produce an upper coil 10-1 and a lower coil 10-2. These coils were superposed in vertical two stages, and the inside ends 20 thereof were connected to each other. This joint was insulated again with a polyimide tape.

The upper coil 10-1 and the lower coil 10-2 were superposed in the manner shown in FIG. 5(B). That is, the upper coil 10-1 was inverted and superposed on the lower coil 10-2 so that current flowed in the same rotational direction during voltage application.

With respect to dimensions, each coil had an inner diameter of ϕ 47 mm. The number of turns was 18 in each of the lower coil 10-2 and the upper coil 10-1, the total number of turns being 36.

An insulating sheet 21 having a thickness of 0.5 mm was interposed between the upper coil 10-1 and the lower coil 10-2.

The core 16 has been configured so that the coil 10 was enclosed therein in an embedded state without leaving any space therebetween, and has such dimensions that the outer diameter of the core is q 90 mm and the core height is 40.5 mm.

The core 16 and the coil 10 have been disposed so that the axis of the core 16 coincides with the axis of the coil 10 and that the axial-direction center of the core 16 coincides with the axial-direction center of the coil 10.

(b) Evaluation Methods

Figure 11:
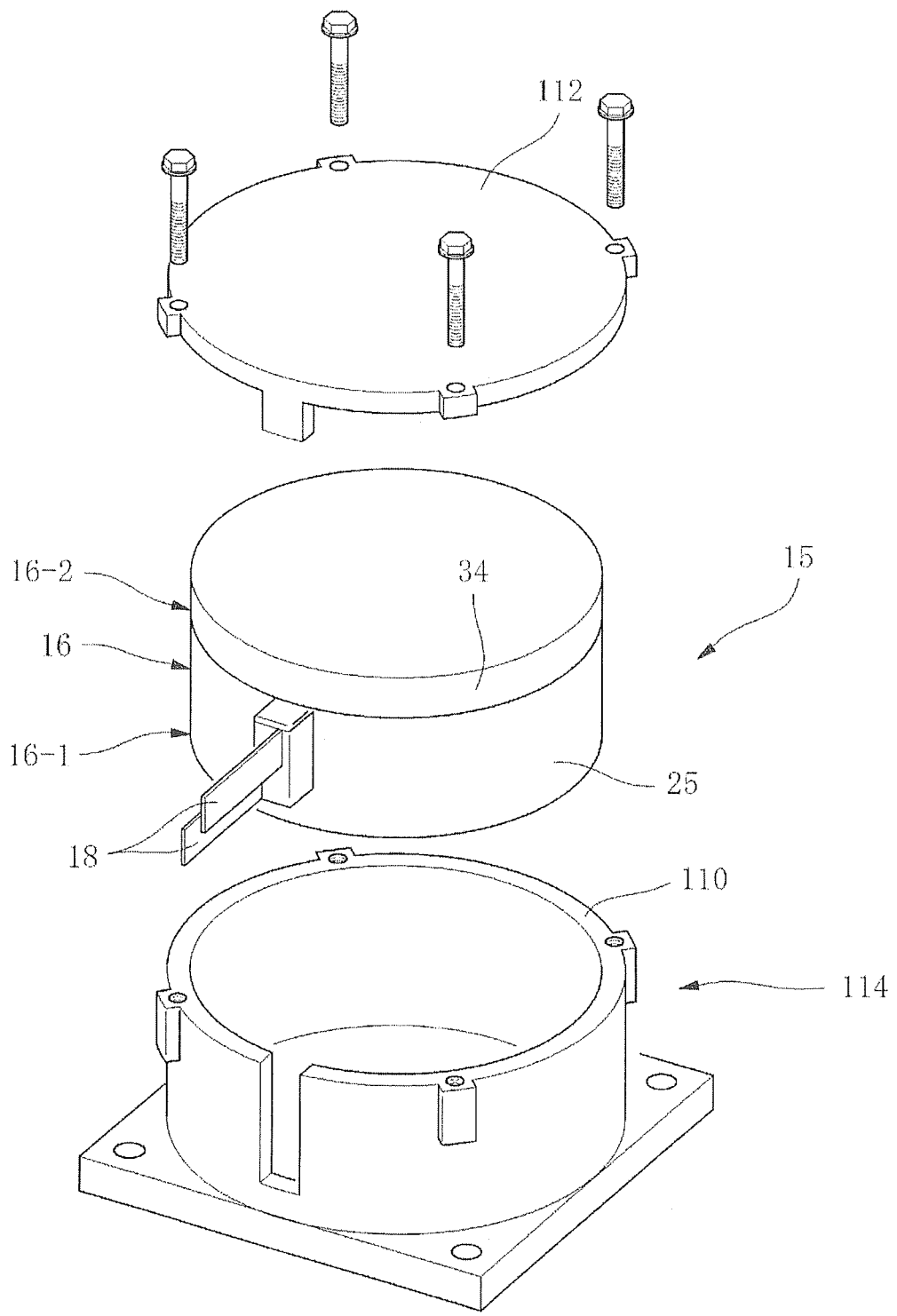
FIG. 11 shows an explanatory view for illustrating a test method for evaluating properties of a core.

The properties shown in Tables 3 and 4 including loss, vibration, noise, and inductance were evaluated while keeping the reactor 15 housed in the aluminum case (reactor case) 114 shown in FIG. 11 which included a container portion 110 and a cover portion 112.

The aluminum case 114 had a wall thickness of 5 mm.

Fixing between the aluminum case 114 and the reactor 15 was made by filling a silicone resin into the space between the container portion 110 and the reactor 15, disposing the cover 112 thereon, and bolting the cover 112.

(c) Measurement of Inductance

Inductance was measured in the following manner. The reactor 15 placed in the aluminum case 114 was incorporated into a boosting chopper circuit. A given superimposed current was caused to flow at an input voltage of 300 V, a voltage after boosting of 600 V, and a switching frequency of 10 kHz to operate the circuit. The current which flowed through the reactor was examined for waveform (the current was measured with a clamp type ammeter attached to one of the terminals), and the inductance was calculated from the inclination of the current waveform observed in a given time period.

(d) Loss Measurement

Loss was measured by the following method.

The reactor 15 placed in the aluminum case 114 was fixed to a water-cooled plate. At this time, a heat conduction grease was thinly spread between the water-cooled plate and the aluminum case 114.

At a superimposed current of 0 A, the reactor was operated from 300 V to 600 V under the conditions of 10 kHz using the same boosting chopper circuit as in the inductance measurement and was continuously operated until the reactor came into a thermally steady state (the state where the internal temperature of the core and the temperature of the cooling water did not change with time). The cooling water was controlled so as to have a temperature of 50° C. and flow at 10 liters per minute, with a chiller (constant-temperature-water circulator).

A quantity of heat was determined from the flow rate of the cooling water flowing through the water-cooled plate and from the difference in temperature between the inlet side and the outlet side, and this quantity of heat was taken as the loss.

Here, the loss occurring at a superimposed current of 0 A is divided according to factor into the following.

Loss due to the loss of the core material (sum of hysteresis loss and eddy current loss) (core loss).

Loss due to the heat generation by the coil that corresponds to the amplitude of the current obtained by subtracting the superimposed direct current from the current flowing through the reactor (alternating copper loss).

Loss due to the skin effect that is produced when high-frequency current flows through the wire of the coil (skin effect loss).

Loss due to the proximity effect whereby adjacent wires mutually inhibit the current flow within the other (proximity effect loss).

Since accurate division into these losses is difficult, the losses occurring at a superimposed current of 0 A are directly compared in Table 3.

(e) Vibration Measurement

<Operation Conditions>: The reactor 15 placed in the aluminum case 114 was incorporated into a boosting chopper circuit, and the circuit was operated under the conditions of an input voltage of 300 V, voltage after boosting of 600 V, switching frequency of 10 kHz, and superimposed current of 80 A.

The measurement was made, with rubber blocks disposed beneath the four corners of the bottom surface of the aluminum case 114.

Figure 12:
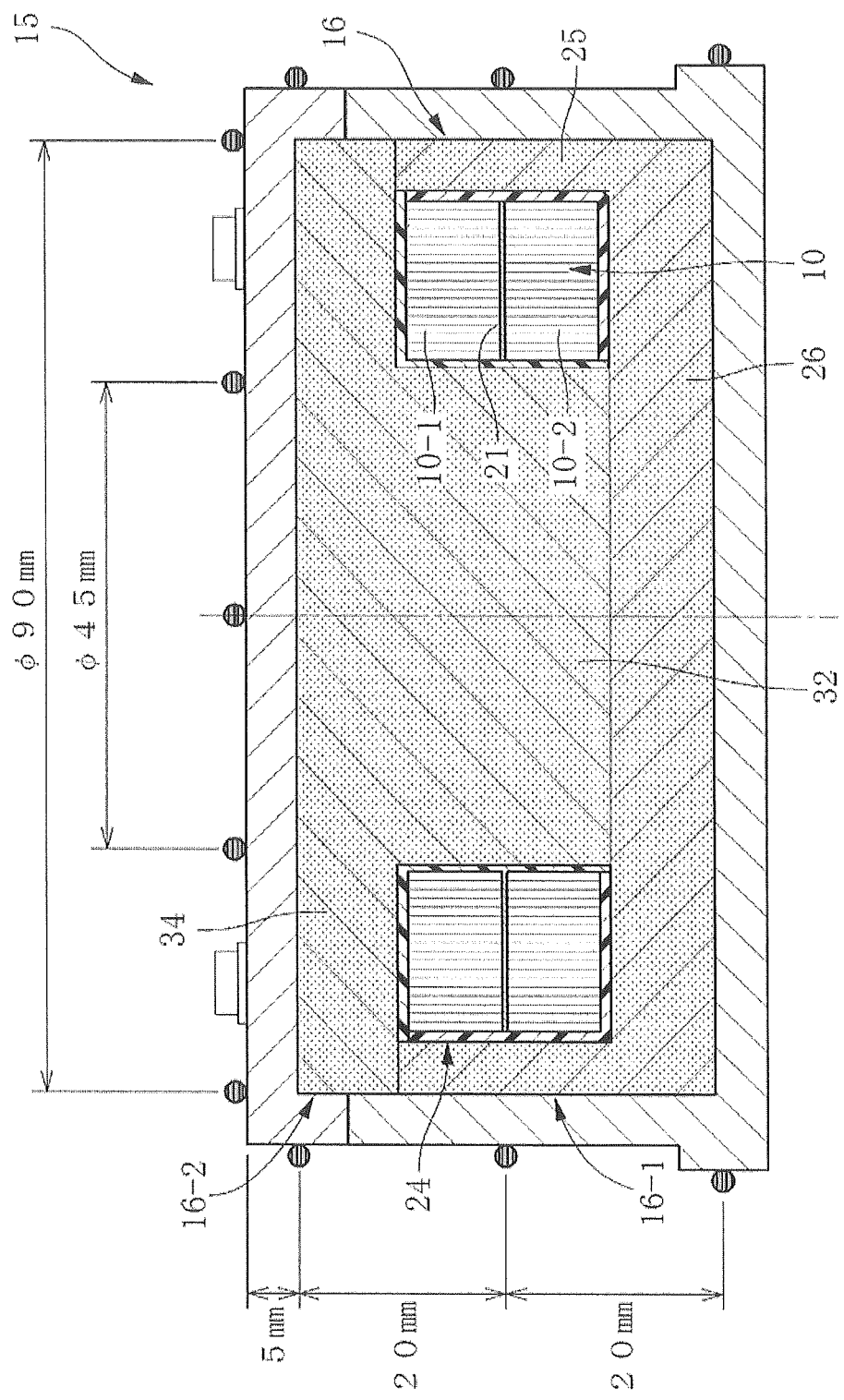
FIG. 12 shows a view showing the positions at which vibration pickups are attached in a vibration measurement.

<Measurement Conditions>: Vibration pickups connected to an FFT analyzer were attached through an insulating spacer to the positions indicated by the solid circles in FIG. 12. The data received from the vibration pickups were processed by FFT at 10 kHz to obtain vibration values. While the cross-section shown in FIG. 12 was shifted by 45 degrees at a time, the measurement was made over the whole circumference. The largest among the measured vibration values was taken as a representative value.

<Measuring Devices>: The vibration pickups used were NP-2910, manufactured by ONO Sokki Co., Ltd., and the FFT analyzer used was DS-3000, manufactured by ONO Sokki Co., Ltd.

(f) Noise Measurement

<Operation Conditions>: The same conditions as in the vibration measurement were used.

<Measurement Conditions>: A microphone was disposed just above the center of the reactor 15 at a distance of 100 mm therefrom, and the data was processed by FFT at 10 kHz to obtain a noise value.

<Measuring Devices>: The microphone used was NL-32, manufactured by RION Co., Ltd., and the FFT program used was NX-22FT, manufactured by RION Co., Ltd.

(g) Flammability Evaluation

<Method of Measurement>: Measurement was made in accordance with the standard UL 94V.

<Test Specimens>: The same compound as for the core 16 was molded into strips having dimensions of 125×13×1.5 mm to obtain test specimens.

(h) Flowability

The flowability shown in Table 4 is the flowability of compounds. This flowability was evaluated in accordance with JIS K 7210, method B by measuring the following sampling time t under the following conditions and determining the following MVR.

Test load: 10 kg
Temperature: 315° C.
Heating time: 6 min
Sampling time t: Time required for the piston to move over a distance of L was measured (L=25 mm).
MVR ($cm^3$/10 min)=427×L/t The results of those measurements are summarized in Tables 3 and 4.

<Withstand Voltage Measurement>

Withstand voltage was measured in the following manner.

Here, the reactor 15 was directly disposed on an aluminum base plate to bring the reactor 15 into the state of being electrically connected to the aluminum base plate. One of the terminals of a measuring device was connected to one coil terminal 18 of the reactor 15, and the other terminal was connected to the aluminum base plate. Voltage application to the reactor 15 in this state was conducted so that the voltage was gradually increased from alternating current 0 V to 3,500 V (volts) and kept at 3,500 V for 1 second.

Withstand voltage was assessed based on the following criteria: the reactor was rated as acceptable or unacceptable when the current which flowed therethrough during the voltage application was up to 10 mA (milliamperes) or higher than that, respectively.

<Thermal Shock Test>

A thermal shock test was performed in the following manner.

(a) [Test Method]: The following thermal shock test device was used, and the low-temperature chamber and the high-temperature chamber were kept at −40° C. and 150° C., respectively. Exposure to the low temperature and exposure to the high temperature were alternately repeated to perform 1,000 cycles. The period of each exposure was 2 hours.

(b) [Evaluation Criteria]: After the 1,000 cycles, (i) the reactor has an appearance with no cracks; (ii) the reactor is capable of clearing the withstand voltage test again; and (iii) the change in inductance through the thermal shock test is 5% or less.

(c) [Test Device]: Type TSA-41L-A, manufactured by ESPEC Corp.

TABLE 3

| | X (% by mass) | Y (% by mass) | Coefficient of linear thermal expansion ×10$^{-5}$ (1/K) *6 | Tensile modulus (GPa) |
|---|---|---|---|---|
| Reference value | | | | |
| Comparative Example 1 | 91.23 | 0 | 2.42 | 31.2 |
| Example 1 | 91.23 | 3 | 2.38 | 22.2 |
| Example 2 | 91.23 | 17 | 2.28 | 14.5 |
| Example 3 | 91.23 | 35 | 2.10 | 8.4 |
| Comparative | 91.23 | 50 | 1.90 | 6.2 |

| | Loss (W) | Vibration (G) | Noise (dB) | Flammability (UL 94) |
|---|---|---|---|---|
| Reference value | 50 or less | 5 or less | 70 or less | V-0 or higher |
| Comparative Example 1 | 52 (unacceptable) | 0.2 | 44 | met V-0 |
| Example 1 | 45 | 0.5 | 48 | met V-0 |
| Example 2 | 40 | 1.2 | 53 | met V-0 |
| Example 3 | 36 | 5.1 | 62 | met V-0 |
| Comparative Example 2 | 33 | 10.2 (unacceptable) | 73 (unacceptable) | met V-1 (unacceptable) |

*6: average value for 20 to 150° C.

TABLE 4

| | X (% by mass) | Y (% by mass) | Flowability (cm³/10 min) | Inductance (μH) |
|---|---|---|---|---|
| Reference value | | | 100 or higher | 300 or higher |
| Comparative Example 3 | 82.63 | 17 | 632 | 280 (unacceptable) |
| Example 4 | 84.90 | 17 | 453 | 310 |
| Example 5 | 91.23 | 17 | 281 | 400 |
| Example 6 | 95.88 | 17 | 112 | 490 |
| Comparative Example 4 | 97.31 | 17 | 91 (unacceptable) | 520 |

Table 3 shows the results obtained when the mixing ratio X of the soft magnetic powder was kept constant and the mixing ratio Y of the low-density polyethylene resin was changed. The results in this Table 1 show that in Comparative Example 1, in which the low-density polyethylene resin had not been added, the reactor showed a large loss, which did not satisfy the reference value.

In Comparative Example 2, in which the low-density polyethylene resin had been mixed in a large amount exceeding 40%, the reactor showed a small loss but the vibration and noise characteristics thereof did not satisfy the reference values. This reactor was unacceptable also in terms of flammability.

In contrast, in Examples 1, 2, and 3, in which the low-density polyethylene resin had been mixed in amounts of 2% to 40% by mass, the reactors each showed a small loss, which satisfied the reference value.

As the mixing ratio of the resin increased, the loss became smaller in the order of Example 1, Example 2, and Example 3.

It can be seen from those results that the addition of the low-density polyethylene resin reduces the loss and that increasing the mixing ratio thereof reduces the loss but tends to impair properties including vibration and noise. Furthermore, the following can, for example, be seen. In the case where the proportion of the polyethylene resin is increased beyond a certain level, the flammability also becomes unacceptable. By mixing the low-density polyethylene in an amount within the proper range of 2 to 40% by mass, all the loss, vibration, noise, and flammability characteristics are rendered satisfactory.

Next, Table 4 shows the results obtained when the mixing ratio of the low-density polyethylene resin was kept constant and the mixing ratio of the soft magnetic powder was changed. The results in Table 4 show that in Comparative Example 3, in which the mixing ratio of the soft magnetic powder was less than 83%, the inductance did not satisfy the reference value although the flowability was satisfactory.

In Comparative Example 4, in which the mixing ratio of the soft magnetic powder was as large as above 96% in contrast with Comparative Example 3, the flowability did not satisfy the reference value although the inductance was satisfactory.

Meanwhile, in Examples 4 to 6, in which the mixing ratio of the soft magnetic powder was in the range of 83 to 96%, both the inductance and flowability characteristics satisfied the reference values.

It can be seen from the results given in Table 4 that by mixing the soft magnetic powder in an amount within the proper range of 83 to 96%, both satisfactory inductance and satisfactory flowability are obtained.

With respect to each of the Examples shown in Tables 3 and 4, the results of the withstand voltage and thermal shock tests were acceptable.

Next, Table 5 shows the results obtained when an ethylene-vinyl acetate copolymer resin was used as a low-melting-point resin B in place of the low-density polyethylene resin shown in Table 1 and when the mixing ratio thereof was variously changed.

The ethylene-vinyl acetate copolymer resin used was as follows.

Ethylene-vinyl acetate copolymer resin: Ube-Maruzen Polyethylene Co., Ltd.; product name, UM8420 EVA; 200 μm pulverized powder

TABLE 5

| | X (% by mass) | Y (% by mass) | Coefficient of linear thermal expansion ×$10^{-5}$ (1/K) *7 | Tensile modulus (GPa) |
|---|---|---|---|---|
| Reference value | | | | |
| Comparative Example 5 | 91.23 | 0 | 2.42 | 31.2 |
| Example 7 | 91.23 | 3 | 2.39 | 21.1 |
| Example 8 | 91.23 | 17 | 2.30 | 13.3 |
| Example 9 | 91.23 | 35 | 2.05 | 7.3 |
| Comparative Example 6 | 91.23 | 50 | 1.92 | 5.1 |

| | Loss (W) | Vibration (G) | Noise (dB) | Flammability (UL 94) |
|---|---|---|---|---|
| Reference value | 50 or less | 5 or less | 70 or less | V-0 or higher |
| Comparative Example 5 | 52 (unacceptable) | 0.2 | 44 | met V-0 |
| Example 7 | 44 | 0.5 | 49 | met V-0 |
| Example 8 | 38 | 1.3 | 55 | met V-0 |
| Example 9 | 35 | 5.3 | 65 | met V-0 |
| Comparative Example 6 | 30 | 10.5 (unacceptable) | 74 (unacceptable) | met V-1 (unacceptable) |

*7: average value for 20 to 150° C.

As shown in Table 5, results similar to the results shown in Table 1 were obtained even in the case where the ethylene-vinyl acetate copolymer resin was used as a low-melting point resin B.

Incidentally, the proportion X of the soft magnetic powder actually contained in a reactor or compound, the proportion Y of the low-melting resin B actually contained therein, etc. can be determined, for example, by the following methods.

The proportion X of the soft magnetic powder can be determined in accordance with JIS K 7250 (2006) "Plastics/Method for Determining Ash Content".

First, the weight of a test sample is measured before burning. This sample is put in a platinum crucible and heated to 950° C. in a muffle furnace in the air to burn off the organic material components until a constant weight is reached. The resultant combustion residue is obtained.

However, there is a possibility that in this residue, the soft magnetic powder might have changed in weight due to the oxidation thereof which occurred during the combustion. Consequently, the combustion residue obtained is reduced in a reducing furnace in a hydrogen atmosphere at 950° C.

The soft magnetic powder is taken out, with a permanent magnet, from the ash which remains finally, and the weight thereof is measured. X is determined therefrom using the following equation.

$X$=[(weight of soft magnetic powder remaining after combustion)/(weight of test sample before combustion)]×100

Meanwhile, the proportion Y of the low-melting-point resin B can be determined using general methods of thermal analysis. Of these, use can be made of thermogravimetry/differential thermal analysis (TG/DTA), pyrolysis gas chromatography-mass spectroscopy (Py-GC/MS), a chloroform extraction method, and the like.

More specifically, in then thermogravimetry (TG), a test sample is pulverized and then heated from 100° C. to 900° C. in each of nitrogen, dry air, and hydrogen atmospheres while changing the atmosphere in that order. The resultant changes in weight of the test sample during the treatment are determined.

When an atmosphere is changed, the atmosphere heated to 900° C. is cooled to 100° C. Thereafter, the next atmosphere is heated again to 900° C.

The rate of heating during the heating is, for example, 10° C./min.

Figure 13:
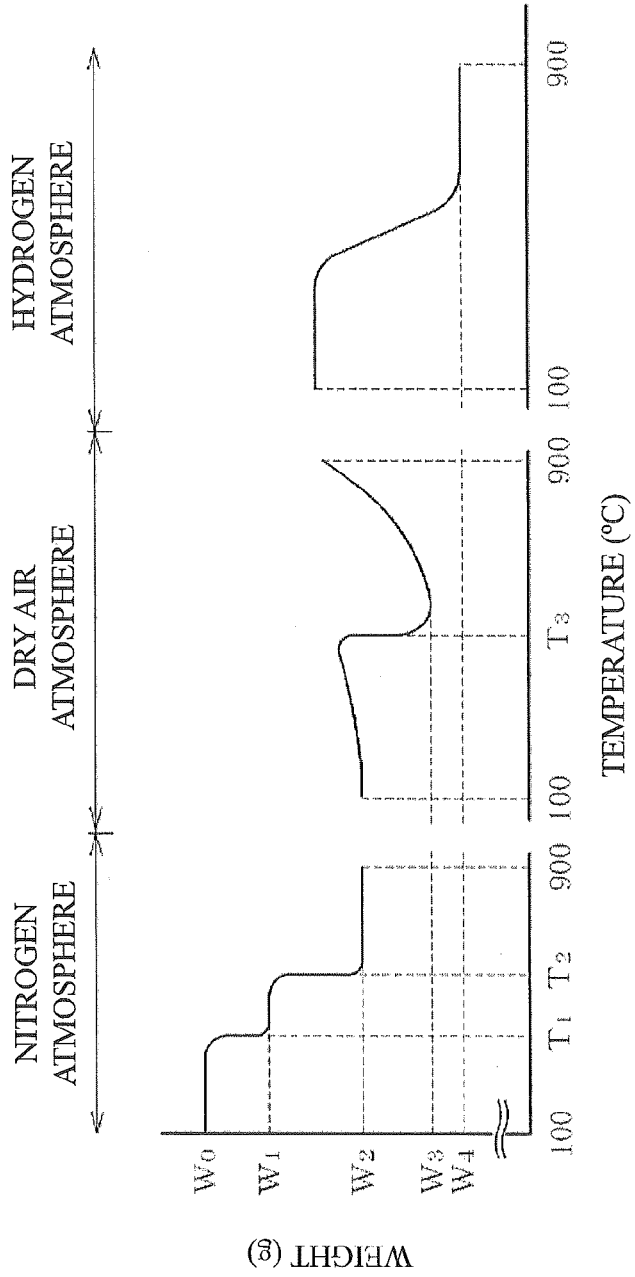
FIG. 13 shows an explanatory view showing an example of methods for determining the proportion X of a soft magnetic powder and the proportion Y of a low-melting-point resin B.

A graph which shows the weight changes is given in FIG. 13.

In FIG. 13, $W_0$ indicates the initial weight measured at the start. The low-melting-point resin B is first pyrolyzed by the heating in a nitrogen atmosphere, resulting in a decrease in weight which corresponds thereto ($W_1$).

As the temperature rises further, part of the base resin A is subsequently pyrolyzed, resulting in a decrease in weight ($W_2$).

Thereafter, the atmosphere is changed to dry air and heating is conducted therein. As a result, the remaining base resin A is pyrolyzed to result in a decrease in weight ($W_3$), but the soft magnetic powder oxidizes simultaneously therewith to cause an increase in weight.

Consequently, the atmosphere is then changed to a hydrogen atmosphere, and heating is conducted therein to reduce the powder. As a result, the increase in weight due to the oxidation is diminished, finally giving a weight ($W_4$).

Since Y is the proportion of the low-melting-point resin B in all resins, Y can be determined using the following equation.

$Y=((W_0-W_1)/(W_0-W_4))\times 100$

The test sample for determining the X and Y may be used either a sample cut out, in an appropriate amount, of any desired portion of the core material of the reactor or a sample taken out, at any timing, from the compound discharged from a kneader.

It is desirable that X and Y should be determined from average values obtained through examination of a plurality of test samples.

Although embodiments and Examples of the invention were described above in detail, there are mere examples. The invention can be configured in variously modified modes so long as the modifications do not depart from the spirit of the invention.

DESCRIPTION OF REFERENCE NUMERALS

10: Coil
15: Reactor
16: Core

The invention claimed is:

1. An injection-molded reactor, wherein a substance obtained by adding a low-melting-point resin B that has a melting point of 150° C. or lower and has a lower melting point than that of a base resin A to the base resin A that is a highly heat-resistant resin with a melting point of 150° C. or higher and that accounts for most of a thermoplastic resin is used as the thermoplastic resin forming a resin binder; a compound for a core is obtained by mixing the base resin A and the low-melting-point resin B with a soft magnetic powder in a proportion represented by the following expression (1); and the core is injection-molded by using the compound in a state where a coil in which a electric wire is wound is embedded in an inner portion without an interval to configure the injection-molded reactor, $$X \cdot (\text{soft magnetic powder}) + (100-X) \cdot ((100-Y) \cdot (\text{base resin } A) + Y \cdot (\text{low-melting-point resin } B)) \quad \text{expression (1)}$$

wherein X is 83 to 96% by mass and Y is 2 to 40% by mass.

2. The injection-molded reactor according to claim 1, wherein the base resin A is at least one kind of polyphenylene sulfide resins, polyamide resins and polyetheretherketone resins, and the low-melting-point resin B is at least one kind of polyethylene resins, ethylene-vinyl acetate copolymer resins, polystyrene resins and polypropylene resins.

3. A compound for a core of the injection-molded reactor according to claim 1.

4. A compound for a core of the injection-molded reactor according to claim 2.

* * * * *